United States Patent
Hebrink et al.

(10) Patent No.: US 11,654,664 B2
(45) Date of Patent: May 23, 2023

(54) COMPOSITE COOLING FILM COMPRISING A REFLECTIVE NONPOROUS ORGANIC POLYMERIC LAYER AND A UV-PROTECTIVE LAYER

(71) Applicant: 3M INNOVATIVE PROPERTIES COMPANY, St. Paul, MN (US)

(72) Inventors: Timothy J. Hebrink, Scandia, MN (US); Milind B. Sabade, Woodbury, MN (US); Laura R. Nereng, Woodbury, MN (US); Caleb T. Nelson, McKinney, TX (US); James P. Burke, St. Paul, MN (US); Vivian W. Jones, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/787,188

(22) PCT Filed: Jan. 13, 2021

(86) PCT No.: PCT/IB2021/050230
§ 371 (c)(1),
(2) Date: Jun. 17, 2022

(87) PCT Pub. No.: WO2021/144714
PCT Pub. Date: Jul. 22, 2021

(65) Prior Publication Data
US 2023/0019944 A1    Jan. 19, 2023

Related U.S. Application Data

(60) Provisional application No. 62/961,859, filed on Jan. 16, 2020.

(51) Int. Cl.
*B32B 27/20* (2006.01)
*C08K 3/22* (2006.01)
(Continued)

(52) U.S. Cl.
CPC ............... *B32B 27/20* (2013.01); *B32B 3/30* (2013.01); *B32B 7/12* (2013.01); *B32B 27/08* (2013.01);
(Continued)

(58) Field of Classification Search
CPC .. B32B 27/20; B32B 3/30; B32B 7/12; B32B 27/08; B32B 27/304; B32B 27/308;
(Continued)

(56) References Cited

U.S. PATENT DOCUMENTS

| | | | |
|---|---|---|---|
| 4,329,384 A | 5/1982 | Vesley et al. | |
| 4,330,590 A | 5/1982 | Vesley | |

(Continued)

FOREIGN PATENT DOCUMENTS

| | | |
|---|---|---|
| CN | 110216924 A | 9/2019 |
| EP | 3744517 A1 | 12/2020 |

(Continued)

OTHER PUBLICATIONS

Gentle, "A Subambient Open Roof Surface on the Mid-Summer Sun", Advanced Science, Sep. 2015, vol. 2, No. 9, 4 pages.
(Continued)

*Primary Examiner* — Nathan L Van Sell

(57) ABSTRACT

A composite cooling film including a reflective nonporous inorganic-particle-filled organic polymeric layer, an ultraviolet-protective layer or layers, and an antisoiling layer.

24 Claims, 10 Drawing Sheets

(51) Int. Cl.

| | | |
|---|---|---|
| *C08K 3/26* | (2006.01) | |
| *C08K 3/30* | (2006.01) | |
| *C08K 3/34* | (2006.01) | |
| *B32B 3/30* | (2006.01) | |
| *B32B 7/12* | (2006.01) | |
| *B32B 27/08* | (2006.01) | |
| *B32B 27/30* | (2006.01) | |
| *B32B 27/32* | (2006.01) | |
| *B32B 27/40* | (2006.01) | |
| *G02B 5/20* | (2006.01) | |
| *G02B 5/26* | (2006.01) | |
| *G02B 1/04* | (2006.01) | |
| *C08J 5/12* | (2006.01) | |

(52) U.S. Cl.
CPC .......... *B32B 27/304* (2013.01); *B32B 27/308* (2013.01); *B32B 27/32* (2013.01); *B32B 27/322* (2013.01); *B32B 27/40* (2013.01); *C08J 5/124* (2013.01); *C08K 3/22* (2013.01); *C08K 3/26* (2013.01); *C08K 3/30* (2013.01); *C08K 3/346* (2013.01); *G02B 1/04* (2013.01); *G02B 5/208* (2013.01); *G02B 5/26* (2013.01); *B32B 2250/24* (2013.01); *B32B 2255/26* (2013.01); *B32B 2264/104* (2013.01); *B32B 2264/1022* (2020.08); *B32B 2264/1023* (2020.08); *B32B 2264/1025* (2020.08); *B32B 2264/1027* (2020.08); *B32B 2307/302* (2013.01); *B32B 2307/416* (2013.01); *B32B 2307/71* (2013.01); *B32B 2307/732* (2013.01); *C08J 2323/00* (2013.01); *C08J 2327/00* (2013.01); *C08J 2333/12* (2013.01); *C08J 2375/04* (2013.01); *C08K 2003/2227* (2013.01); *C08K 2003/2237* (2013.01); *C08K 2003/2296* (2013.01); *C08K 2003/265* (2013.01); *C08K 2003/3045* (2013.01)

(58) Field of Classification Search
CPC ....... B32B 27/32; B32B 27/322; B32B 27/40; B32B 2250/24; B32B 2255/26; B32B 2264/1022; B32B 2264/1023; B32B 2264/1025; B32B 2264/1027; B32B 2264/104; B32B 2307/302; B32B 2307/416; B32B 2307/71; B32B 2307/732; C08J 5/124; C08J 2323/00; C08J 2327/00; C08J 2333/12; C08J 2375/04; C08K 3/22; C08K 3/26; C08K 3/30; C08K 3/346; C08K 2003/2227; C08K 2003/2237; C08K 2003/2296; C08K 2003/265; C08K 2003/3045; G02B 1/04; G02B 5/208; G02B 5/26

See application file for complete search history.

(56) References Cited

U.S. PATENT DOCUMENTS

| | | |
|---|---|---|
| 4,379,201 A | 4/1983 | Heilmann et al. |
| 4,737,559 A | 4/1988 | Kellen et al. |
| 5,073,611 A | 12/1991 | Rehmer et al. |
| 5,882,774 A | 3/1999 | Jonza et al. |
| 6,045,894 A | 4/2000 | Jonza et al. |
| 6,265,029 B1 | 7/2001 | Lewis |
| 6,277,485 B1 | 8/2001 | Invie et al. |
| 6,368,699 B1 | 4/2002 | Gilbert et al. |
| 6,531,230 B1 | 3/2003 | Weber et al. |
| 6,667,095 B2 | 12/2003 | Wheatley et al. |
| 6,783,349 B2 | 8/2004 | Neavin et al. |
| 6,991,826 B2 | 1/2006 | Pellerite et al. |
| 7,271,951 B2 | 9/2007 | Weber et al. |
| 7,328,638 B2 | 2/2008 | Gardiner et al. |
| 7,350,442 B2 | 4/2008 | Ehnes et al. |
| 7,632,568 B2 | 12/2009 | Padiyath et al. |
| 7,652,736 B2 | 1/2010 | Padiyath et al. |
| 7,952,805 B2 | 5/2011 | Mcgurran et al. |
| 9,523,516 B2 | 12/2016 | Hebrink et al. |
| 9,568,653 B2 | 2/2017 | O'Neill et al. |
| 9,614,113 B2 | 4/2017 | Weigel et al. |
| 9,670,300 B2 | 6/2017 | Olson et al. |
| 9,939,557 B2 | 4/2018 | David et al. |
| 10,072,173 B2 | 9/2018 | Clear et al. |
| 10,125,251 B2 | 11/2018 | Olson et al. |
| 10,134,566 B2 | 11/2018 | David et al. |
| 10,323,151 B2 | 6/2019 | Van Overmeere et al. |
| 2009/0147361 A1 | 6/2009 | Gardiner et al. |
| 2013/0236697 A1 | 9/2013 | Walker, Jr. et al. |
| 2014/0131023 A1 | 5/2014 | Raman et al. |
| 2015/0131146 A1 | 5/2015 | Fan et al. |
| 2015/0175479 A1 | 6/2015 | Brown et al. |
| 2015/0338175 A1 | 11/2015 | Raman et al. |
| 2016/0268464 A1 | 9/2016 | Fan et al. |
| 2018/0180331 A1 | 6/2018 | Yu et al. |
| 2019/0111666 A1 | 4/2019 | Hebrink et al. |
| 2019/0152410 A1 | 5/2019 | Zhu et al. |
| 2019/0316854 A1 | 10/2019 | Fain |

FOREIGN PATENT DOCUMENTS

| | | |
|---|---|---|
| WO | 1995016754 A1 | 6/1995 |
| WO | 1995017303 A1 | 6/1995 |
| WO | 1999039224 A1 | 8/1999 |
| WO | 2000048037 A2 | 8/2000 |
| WO | 2002012404 A2 | 2/2002 |
| WO | 2007087281 A1 | 8/2007 |
| WO | 2017151514 A1 | 9/2017 |
| WO | 2017172564 A2 | 10/2017 |
| WO | 2018130926 A1 | 7/2018 |
| WO | 2019130198 A1 | 7/2019 |
| WO | 2019130199 A1 | 7/2019 |
| WO | 2020240366 A1 | 12/2020 |

OTHER PUBLICATIONS

Hossain, "A Metamaterial Emitter for Highly Efficient Radiative Cooling", Advanced Optical Materials, 2015, vol. 3, No. 8, pp. 1047-1051.
Hossain, "Radiative Cooling: Principles, Progress, and Potentials", Advanced Science, 2016, vol. 3, No. 7,10 pages.
International Search Report for PCT Application No. PCT/IB2021/050230 dated Apr. 16, 2021, 4 pages.
Raman, "Passive Radiative Cooling below ambient air temperature under direct sunlight", Nature, Nov. 27, 2014, vol. 515, No. 7528, pp. 540-544.
Satas, "Handbook of Pressure Sensitive Adhesive Technology", 172 (1989).
Zhai, "Scalable-manufactured randomized glass-polymer hybrid metamaterial for daytime radiative cooling", Science, Mar. 10, 2017, vol. 355, No. 6329, pp. 1062-1066.

US 11,654,664 B2

COMPOSITE COOLING FILM COMPRISING A REFLECTIVE NONPOROUS ORGANIC POLYMERIC LAYER AND A UV-PROTECTIVE LAYER

CROSS REFERENCE TO RELATED APPLICATIONS

This application is a national stage filing under 35 U.S.C. 371 of PCT/IB2021/050230, filed 13 Jan. 2021, which claims the benefit of U.S. Provisional Patent Application No. 62/961,859, filed 16 Jan. 2020, the disclosure of which is incorporated by reference in its/their entirety herein.

BACKGROUND

Entities such as, e.g., vehicles and buildings, transformers, and so on are often equipped with active cooling systems in order to remove thermal energy acquired by the impingement of solar radiation on the entity, to remove thermal energy generated internally by the entity itself, and so on.

SUMMARY

In broad summary, herein is disclosed a passive radiative composite cooling film suitable for use in passively cooling a substrate (which substrate may be attached to, and/or a part of, an entity such as a vehicle or building). In broad summary, a composite cooling film comprises a reflective nonporous inorganic-particle-filled organic polymeric layer; an ultraviolet-protective layer of organic polymeric material that is disposed outwardly of the reflective nonporous inorganic-particle-filled organic polymeric layer; and, an antisoiling layer of organic polymeric material. The antisoiling layer is disposed outwardly of the reflective nonporous inorganic-particle-filled organic polymeric layer and comprises an outwardly-facing, exposed antisoiling surface. The composite cooling film may exhibit an average absorbance over the wavelength range 8-13 microns of at least 0.85; in some embodiments, the composite cooling film may exhibit such an absorbance over the wavelength range of 4-20 microns.

These and other aspects will be apparent from the detailed description below. In no event, however, should this broad summary be construed to limit the claimable subject matter, whether such subject matter is presented in claims in the application as initially filed or in claims that are amended or otherwise presented in prosecution.

BRIEF DESCRIPTION OF THE DRAWINGS

FIG. 4A shows a perspective view of a cross section relative to xyz-axes. FIG. 4C shows the cross section of FIG. 4A in an xz-plane. FIG. 4B shows another cross section in a yz-plane.

Figure 1:
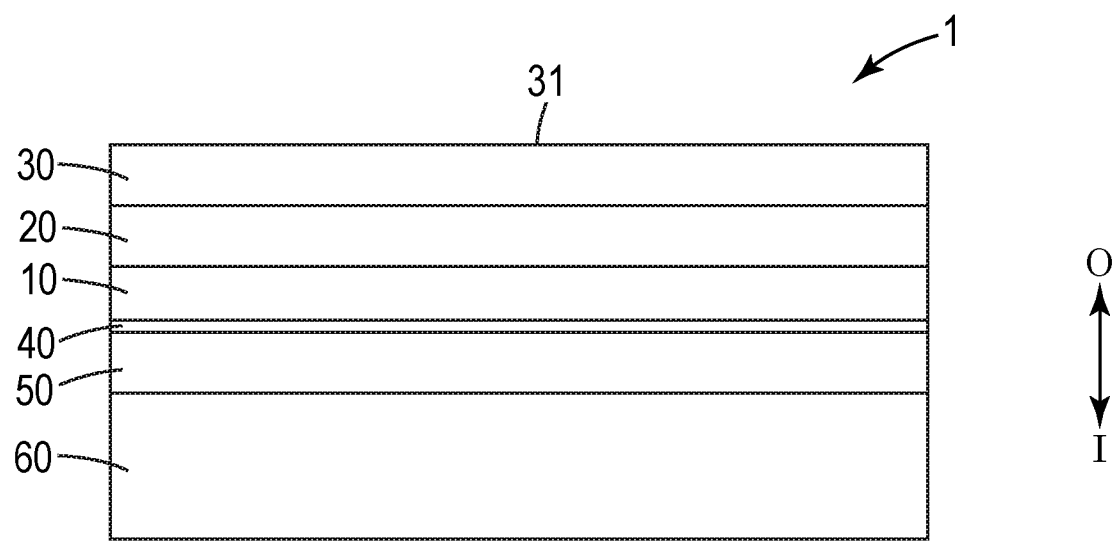
FIG. 1 is a schematic side view of an exemplary composite cooling film bonded to a substrate that is secured to an entity to be cooled.

Unless otherwise indicated, all figures and drawings are not to scale and are chosen for the purpose of illustrating different embodiments of the invention. In particular the dimensions of the various components are depicted in illustrative terms only, and no relationship between the dimensions of the various components should be inferred from the drawings, unless so indicated.

DETAILED DESCRIPTION

As used herein:

"fluoropolymer" refers to any organic polymer containing fluorine;

"infrared" (IR) refers to infrared electromagnetic radiation having a wavelength of >700 nm to 1 mm, unless otherwise indicated;

"visible" (VIS) refers to visible electromagnetic radiation having a wavelength to from 400 nm to 700 nm, inclusive, unless otherwise indicated;

"ultraviolet" (UV) refers to ultraviolet electromagnetic radiation having a wavelength of at least 250 nm and up to but not including 400 nm, unless otherwise indicated;

"microporous" means having internal porosity (continuous and/or discontinuous) having average pore diameters of 50 to 10,000 nm;

"nonporous" means having a porosity of less than 10% (i.e., a percent void volume of less than 10); in particular instances a nonporous item will exhibit less than 1% void volume of pores having average pore diameters of greater than 50 nm;

"micro-voided" means having internal discrete voids having an average void diameter of 50 to 10,000 nm;

"nonfluorinated" mean not containing fluorine;

"radiation" means electromagnetic radiation unless otherwise specified;

"average reflectance" means reflectance averaged over a specified wavelength range;

"reflective" and "reflectivity" refer to the property of reflecting light or radiation, especially reflectance as measured independently of the thickness of a material; and "reflectance" is the measure of the proportion of light or other radiation striking a surface at normal incidence which is reflected off it. Reflectivity typically varies with wavelength and is reported as the percent of incident light that is reflected from a surface (0 percent—no reflected light, 100—all light reflected; often, such reflectivity is normalized to a 0-1 scale). Reflectivity, and reflectance are used interchangeably herein. Reflectance can be measured according to methods disclosed later herein.

Absorbance can be measured with methods described in ASTM E903-12 "Standard Test Method for Solar Absorptance, Reflectance, and Transmittance of Materials Using Integrating Spheres". Absorbance values can be obtained by making transmittance measurements and then calculating absorbance using Equation 1, hereinbelow.

As used herein, the term "absorbance" refers to the base 10 logarithm of a ratio of incident radiant power to transmitted radiant power through a material. The ratio may be described as the radiant flux received by the material divided by the radiant flux transmitted by the material. Absorbance (A) may be calculated based on transmittance (T) according to Equation 1:

$$A = -\log_{10} T \quad (1)$$

Emissivity can be measured using infrared imaging radiometers with methods described in ASTM E1933-14 (2018) "Standard Practice for Measuring and Compensating for Emissivity Using Infrared Imaging Radiometers."

Terms such as outward, inward, and similar terms, are used with reference to a composite cooling film when secured to a substrate. Outward denotes a direction away from the substrate and inward denotes a direction toward the substrate. An antisoiling layer of the cooling film will typically be the outwardmost surface of the cooling film; in many embodiments, an inwardmost layer of the cooling film may be a layer of adhesive that allows the cooling film to be secured to the substrate. Inward (I) and outward (O) directions are indicated in various figures for clarity. It will be understood that this terminology is used for ease of description and does not limit the actual orientation at which the cooling film may be positioned during actual use (e.g., horizontal, angled so as to face the sun, etc.).

"Disposed atop", "disposed on", "secured to", and like terms, encompass arrangements in which an item is directly or indirectly affixed to (e.g., in direct contact with, or adhesively bonded to by a unitary layer of adhesive) another item. That is, such terms allow the existence of an intervening (e.g., bonding) layer.

A "composite" film comprises multiple layers (any of which may comprise sublayers) and requires that all such layers and/or sublayers are affixed (e.g., bonded) to each other (e.g., by way of pressure-sensitive adhesion, by being melt-bonded to each other, or any like methods) rather than being, e.g., abutted against each other and held in place by mechanical means.

Composite Cooling Film

As illustrated in generic, illustrative representation in FIG. 1, disclosed herein is a composite cooling film 1 comprising a reflective nonporous inorganic-particle-filled organic polymeric layer 10, an ultraviolet (UV)-protective layer 20 of organic polymeric material that is disposed outwardly of reflective layer 10; and, an antisoiling layer 30 of organic polymeric material. Antisoiling layer 30 is disposed outwardly of reflective layer 10 and comprises an outwardly-facing, exposed antisoiling surface 31. Layers 10, 20 and 30 may be affixed or otherwise bonded to each other via any suitable method as discussed herein.

Reflective layer 10 (and cooling film 1 as a whole) may provide passive cooling in the general manner discussed in U.S. Provisional Patent Application No. 62/855,392, which is incorporated by reference in its entirety herein. Reflective layer 10 provides reflectivity in certain wavelengths, and also serves to emit radiation in at least selected wavelengths, as discussed herein, and may be considered to be a reflective/absorptive/emissive layer. Accordingly, layer 10 may exhibit an absorbance of at least 0.5, 0.6, 0.7, 0.8, 0.9, or 0.95 in a wavelength range at least covering the range of from 8 to 13 microns.

UV-protective layer 20 is disposed outward from reflective layer 10 to provide UV protection for reflective layer 10 which may enhance the usable lifetime of cooling film 1. In some embodiments, a UV-protective layer 20 may be a UV-reflecting layer. In some embodiments, a UV-protective layer 20 may be a UV-absorbing layer. In some embodiments, a UV-protective layer 20 may operate in part by absorbing, UV and in part by reflecting UV. In some embodiments, multiple UV-protective layers may be present, e.g., one being a UV-absorbing layer and another being a UV-reflecting layer.

Antisoiling layer 30, being the outwardmost layer of cooling film 1, provides physical protection for the other layers and in particular can impart anti-soiling and/or easy-cleaning properties to the outermost surface of cooling film 1. However, it will be appreciated that in some embodiments UV-protective layer 20 and/or antisoiling layer 30 may contribute at least somewhat to the passive cooling that is achieved by cooling film 1.

In some embodiments, cooling film 1 may comprise a layer of adhesive (e.g., a pressure-sensitive adhesive) 40 which may be used to bond cooling film 1 to a substrate 50 as indicated in FIG. 1. Substrate 50 may in turn be bonded, secured or otherwise in thermal contact with a portion of an entity 60 (e.g., a vehicle or a building) that is to be passively cooled, as indicated in exemplary embodiment in FIG. 1.

Figure 2:
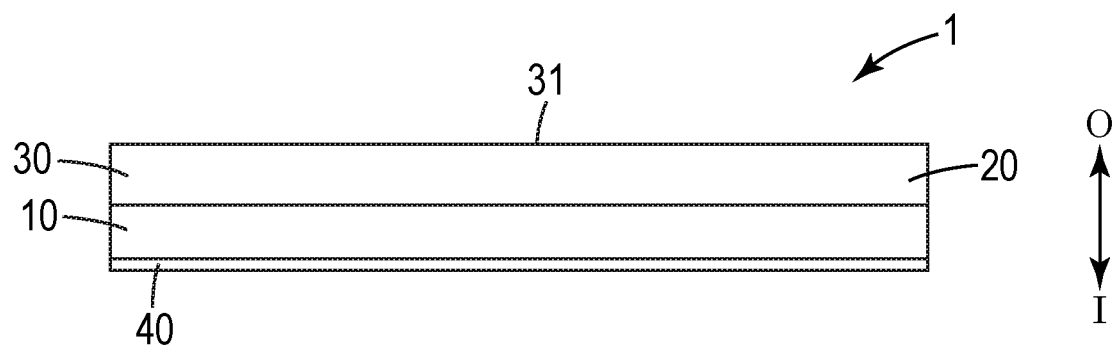
FIG. 2 is a schematic side view of another exemplary composite cooling film.

A wide variety of options are encompassed within the above-disclosed general arrangements. In embodiments of the general type depicted in FIG. 1, antisoiling layer 30 is a separate layer from UV-protective layer 20, with layer 30 being disposed outward of layer 20 and comprising an exposed antisoiling surface 31. In embodiments of the general type depicted in FIG. 2, antisoiling layer 30 is the same layer as UV-protective layer 20 (that is, in such embodiments a single layer may be configured to serve both as an antisoiling layer 30 and as a UV-protective (e.g., UV-absorbing) layer 20, as discussed later herein).

In some embodiments, antisoiling layer 30 may be directly affixed to UV-protective layer 20, as in the exemplary arrangement of FIG. 1. UV-protective layer 20 in turn may be directly affixed to reflective layer 10, also as shown in FIG. 1. Such arrangements may be achieved, e.g., by extruding, coating, or otherwise disposing one layer onto a major surface of another layer, so that the layers are bonded together, as will be readily understood. In other embodiments, antisoiling layer 30 may be indirectly affixed to UV-protective layer 20, e.g., by way of a layer of pressure-sensitive adhesive; similarly, in some embodiments UV-protective layer 20 may be indirectly affixed to reflective layer 10, e.g., by way of a layer of pressure-sensitive adhesive. Any combination of direct or indirect affixing of any of these layers is contemplated.

In some embodiments a UV-protective (e.g., UV-absorbing) layer 20 may take the form of a pressure-sensitive adhesive layer that serves both to bond antisoiling layer 30 to reflective layer 10, and to provide UV-protection. Such an arrangement falls within the general arrangement shown in FIG. 1.

Figure 3:
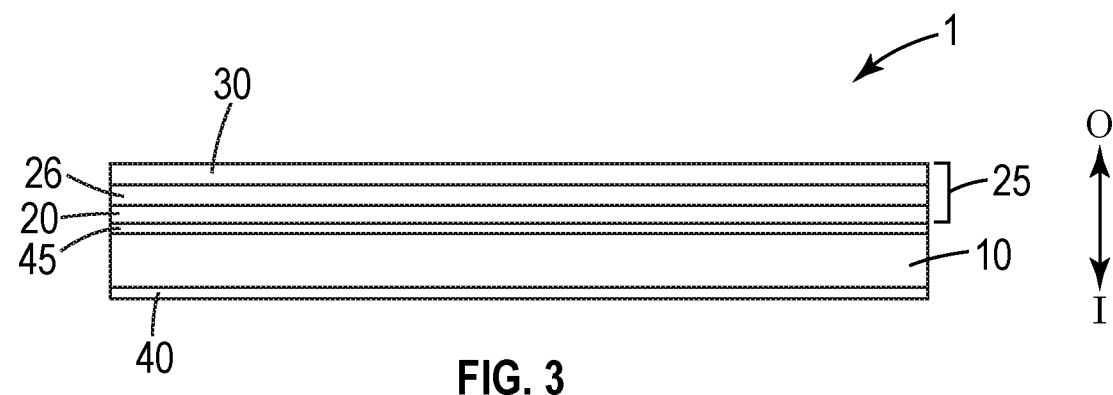
FIG. 3 is a schematic side view of another exemplary composite cooling film.

In some embodiments, a UV-protective layer 20 and/or an antisoiling layer 30 may be a layer of a multilayer structure (e.g., a multilayer coextruded stack) that is disposed outward of reflective layer 10. For example, FIG. 3 depicts an exemplary arrangement in which a multilayer structure 25 (in this case, a triple-layer structure) is disposed outwardly of reflective layer 10. (In the exemplary embodiment of FIG. 3, multilayer structure 25 is bonded to reflective layer 10 by a pressure-sensitive adhesive layer 45.) An outermost layer of the multilayer structure provides antisoiling layer 30; another layer of the multilayer structure, which other layer is positioned inwardly of the antisoiling layer, provides UV-protective layer 20. In the particular arrangement depicted in FIG. 3, structure 25 comprises three layers with the inwardmost layer being UV-protective layer 20 and with an intervening layer 26 lying between layers 30 and 20. However, it will be appreciated that such a multilayer structure may comprise any number of layers, in any arrangement, as long as the structure includes an outwardmost layer that is suitable to serve as an antisoiling layer 30. The compositions of the different layers may be varied in any suitable manner. For example, an outermost layer may be of a composition that provides enhanced antisoiling (for example, it may be a fluoropolymer), while an inward layer may be of a composition (e.g., poly(methyl methacrylate) that easily accepts a high level of UV-blocking additive. One or more intervening layers (e.g., layer 26 as shown in FIG. 3) may serve, for example, as a tie layer that bonds to both the antisoiling layer and the UV-protective layer.

In some embodiments, multiple UV-protective (whether UV-reflecting and/or UV-absorbing, and whether in direct contact with each other or separated by one or more intervening layers) may be present. For example, a UV-absorbing layer may be present that is a layer of a multilayer structure (e.g., a coextruded stack of the general type mentioned above) and another UV-absorbing layer may be present in the form of a UV-absorbing pressure-sensitive adhesive that is used to bond the multilayer structure to the reflective layer.

In some embodiments a UV-protective layer 20 may take the form of, or comprise, a UV-reflective layer. In some embodiments such a layer may take the form of a collection of sublayers that collectively provide UV reflection; for example, as in the case of a so-called multilayer optical film (MOF) that is configured to provide UV-reflection. Any such UV-reflective MOF may be affixed to any of the other layers disclosed herein (e.g., to an antisoiling layer and/or to a reflective nonporous inorganic-particle-filled organic polymeric layer), e.g., by way of a pressure-sensitive adhesive layer.

As noted, cooling film 1 comprises an antisoiling layer 30. In some embodiments, an antisoiling layer 30 may exhibit enhanced resistance to being soiled, and/or may be easily cleaned, by virtue of the chemical composition of at least the exposed surface 31 of the antisoiling layer. In some embodiments the chemical composition of exposed surface 31 may be the same as the bulk composition of layer 30. (In other embodiments surface 31 may be treated in a manner that specifically alters its chemical composition to provide enhanced antisoiling; for example, surface 31 may be plasma-fluorinated.) In some embodiments antisoiling layer 30 may be comprised of fluoropolymer, as discussed in detail later herein. In other embodiments antisoiling layer 30 may be comprised of a so-called hardcoat composition, also as discussed in detail later herein.

In some embodiments, an exposed surface 31 of antisoiling layer 30 may be provided with a texture or topography that provides enhanced antisoiling. Such a texture may, for example, take the form of a set of microstructures and/or nanostructures. In brief, such texture may be formed, e.g., by molding, embossing, or otherwise forming or pressing layer 30 against a textured tooling surface to impart the desired texture to surface 31; by removing material from surface 31 (e.g., by etching, laser ablation, etc.) to impart the desired texture; and/or, by including particulate materials (e.g., glass microspheres or the like) in layer 30 to impart the desired texture. Combinations of these approaches can be used if desired.

As noted, cooling film 1 comprises a reflective nonporous inorganic-particle-filled organic polymeric layer 10. In some embodiments, such a layer may take the form of, e.g., a pre-made inorganic-particle-filled film. By pre-made is meant that the layer already exists in a stable and handleable form prior to being combined with other layers in the process of forming cooling film 1. Such a pre-made inorganic particle-filled film might be, for example, a film of polymethylmethacrylate (PMMA) that is loaded with a suitable amount of reflective inorganic particles. In some embodiments, a reflective layer 10 may be a painted layer, derived from any suitable paint that comprises a suitable amount of inorganic particles. Any such paint may be, for example, painted or otherwise coated onto a suitable substrate and then allowed to solidify. The painted substrate may then be combined with other layers to form cooling film 1. It will thus be understood that all references herein to, for example, using a layer of pressure-sensitive adhesive to affix any layer to a reflective layer 10, encompasses circumstances in which reflective layer 10 is a multilayer structure comprising, e.g., a substrate with a painted layer thereon.

Reflective Organic Polymeric Layer In further detail, reflective nonporous inorganic-particle-filled organic polymeric layer 10 comprises a porosity of less than 10%. Such an entity by definition excludes, e.g., porous layers such as nonwoven webs, microporous materials (in particular, microvoided materials), paper, and the like. In various embodiments, such a nonporous layer may comprise a porosity of less than 8, 6, 4, 2, 1, or 0.5%.

Layer 10 comprises an organic polymeric material that is filled (loaded) with a suitable amount of one or more suitable inorganic particles that provide the desired reflectivity. Such inorganic particles may be chosen from, for example, titanium dioxide, magnesium oxide, aluminum oxide, zinc oxide, calcium carbonate, barium sulfate, silicon dioxide, zirconium dioxide, cerium oxide, aluminum silicate, kaolinite clay, and combinations and blends thereof. The inorganic particles may be present at any loading (weight percent, based on the total weight of the layer) that will provide the desired reflectivity. By definition, an inorganic-particle-filled organic polymeric layer will comprise at least 5 weight percent of reflective inorganic particles. In various embodiments, the reflective inorganic particles may comprise at least 10, 15, 20, 30, 40, 50, 60, or 70 weight percent of layer 10.

The reflective inorganic particles may comprise any suitable average particle size and particle size distribution. In some embodiments at least 20, 40, 60, 80, or 90 percent (by number-average) of the reflective particles may exhibit a diameter (or equivalent diameter, e.g., if irregularly shaped) of less than 5.0, 2.0, or 1.0 microns. In some embodiments at least 90, 95, or 98 percent (again, by number-average) of the particles may be nanoparticles with a diameter or equivalent diameter of less than 1000 nanometers. If desired, the particles may be, e.g., surface-treated to enhance the ability of the particles to be dispersed into the organic polymeric material.

In some embodiments, a reflective layer 10 may take the form of a pre-made inorganic-particle-filled film, meaning that the reflective layer already exists in a stable and handleable form prior to being combined with other layers to form cooling film 1. Such a pre-made inorganic particle-filled film might be, for example, a film of polymethylmethacrylate or co-polymethylmethacrylate (e.g., a co-PMMA such as those available from Kuraray) blended with, e.g., barium sulfate, titanium dioxide and/or calcium carbonate in sufficient amount. However, any suitable organic polymeric material may be used, as long as it exhibits sufficient mechanical properties and can be loaded with an acceptable amount of reflective inorganic particles. Any such layer may be combined with any other layers mentioned herein (e.g., with a UV-protective layer and an antisoiling layer) by, for example, being laminated together with such layers through the use of one or more layers of pressure-sensitive adhesive.

In some embodiments, a reflective layer 10 may be a painted layer. Such a layer may be derived from any suitable paint that is loaded with a suitable amount of inorganic particles. Any such paint may be, for example, disposed (in flowable form) onto a suitable support substrate and then allowed to solidify. The painted substrate may then be combined with other layers to form cooling film 1. As noted, it will be understood that all references herein to, for example, using a layer of pressure-sensitive adhesive to affix a layer (e.g., a UV-protective layer) to a reflective layer 10, encompasses circumstances in which reflective layer 10 is a multilayer structure comprising, e.g., a support substrate with a layer of paint thereon. In some embodiments, such a support substrate may serve to provide purely mechanical support. In some embodiments, such a support substrate may serve at least in part to enhance or augment the reflectivity that is achieved by reflective layer 10. For example, in some embodiments the support substrate may be, e.g., a reflective metal foil or sheeting, made of, e.g., aluminum. In some embodiments, such a support substrate may serve at least in part to enhance or augment any absorbtion/emission properties that are exhibited by layer 10. For example, in some embodiments the support substrate may be, e.g., a film of polyester (e.g., MYLAR film) that, while it may not necessarily contribute any reflectivity, may contribute to the absorbtion/emission that is achieved. Of course, in some embodiments such a support substrate may be, e.g., metallized PET film that may serve both purposes.

A painted reflective layer 10 may be derived from any suitable paint that comprises an organic polymeric film-forming material (often referred to as a binder) that can solidify to form a stable layer (film). (Strictly speaking, a painted layer, layer of paint, etc., as referred to herein, denotes the final, solidified layer that is obtained. However, the term "paint" is used colloquially to refer to both the solidified layer and the precursor flowable mixture from which it is derived.) The binder can be provided in any suitable liquid (e.g., solvent, carrier or diluent) to provide a mixture or solution that can be disposed (e.g., coated) onto a suitable substrate after which the binder can be solidified upon removal of the liquid. The solidification may occur, e.g., via removal of solvent (in the case of a solvent-based paint).

In some embodiments the solidification may occur at least in part by crosslinking, whether promoted by thermal means or by a radiation-curing process such as UV-curing or electron beam curing. If such crosslinking is desired, in some embodiments the binder may include multi-functional monomers to facilitate this.

In some embodiments the paint may be a water-based paint (e.g., an emulsion or dispersion of the type commonly referred to as latex paints) that forms a nonporous (e.g., film) layer upon removal of water. As will be well understood, such drying causes the organic polymer binder to coalesce to form a solid film. Also as will be well understood, such coalescence may, according to its statistical nature, leave behind a small number of voids or cavities in the final, solidified layer of paint. However, such voids will typically be insignificant; in any event, a painted layer will be considered to be a nonporous layer as disclosed herein and in particular will be distinguished from, e.g., microvoided layers and the like.

In some embodiments the solidification of the organic polymeric binder of a paint may not involve any chemical reaction (formation of chemical bonds). In other embodiments, the solidification may involve at least some bond formation, e.g., if the paint includes one or more thermosettable components, e.g., a drying oil such as linseed oil or the like.

In general, an organic polymeric binder of such a paint may be chosen from, or include, materials such as alkyds, acrylics, vinyl acrylics, styrene-acrylics, vinyl acetate/ethylenes, polyurethanes, polyesters, melamine resins, epoxy resins, polysiloxanes, polylactic acid, cellulose, polysaccharides, and so on. In particular embodiments, such a binder may be an acrylic material comprising, e.g., polymethylmethacrylate and/or copolymers thereof. The binder will provide the solidified paint layer with, e.g., mechanical durability and toughness, abrasion resistance, and the like. The paint may include any other materials as are needed for any other purpose, e.g., leveling agents, viscosity modifiers, dyes, biocides, emulsifiers, and so on.

Suitable paints that may be used to form a reflective layer useful for the purposes described herein may include those described, e.g., in U.S. Pat. No. 10,323,151, which is incorporated by reference herein for this purpose. Examples of potentially suitable paints include products available from various sources, e.g., Solarkote, Suntech Coatings, SkyCool, and Exterior Performance Coatings. It will be appreciated that many such paints may include one or more UV-blocking additives or the like, e.g., of the general types mentioned later herein. However, for the particular purposes described herein, the presence of such additives will not negate the need to provide a UV-protective layer outward of the painted reflective layer in the general manner described herein.

A "paint" as disclosed herein encompasses any flowable mixture, solution, dispersion or the like that can be coated (whether by, e.g., knife-coating, spray-coating, etc., and whether done manually or in large-scale coating operations) onto a suitable substrate. Such a coating operation, and other operations as needed to assemble cooling film 1, may be done in any particular order. For example, a layer of paint may be coated and solidified on a substrate, after which the painted substrate may be affixed to a UV-protective layer, e.g., by the use of a pressure-sensitive adhesive layer. Alternatively, a UV-protective layer (e.g., a UV-reflecting multilayer optical film, or a UV-absorbing hardcoat that is itself coated onto a suitable support such as, e.g., a PET film) may be laminated to a substrate (e.g., by way of a pressure-sensitive adhesive layer), after which a suitable paint may be coated onto the other side of the substrate. In still another example, a suitable paint could be coated onto an inward layer of a multilayer structure of the general type discussed above with reference to FIG. 3. And, of course, in some embodiments a UV-protective layer in the form of a pressure-sensitive adhesive layer that is loaded with UV-blocking additive, can be affixed to a painted substrate. Again, it will be evident that numerous particular embodiments are encompassed within the scope of the arrangements disclosed herein.

In various embodiments, layer 10 may be diffusely reflective, for example, of visible radiation over a majority of wavelengths in the range of 400 to 700 nanometers, inclusive. In some embodiments, the reflective layer may have an average reflectance of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 400 nm up to 700 nm. In some embodiments the reflective layer may be reflective over a broader wavelength range. Accordingly, in some embodiments, the layer may have an average reflectance of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 400 nm up to 2.5 micrometers, preferably at least 300 nm to 3.0 micrometers, although this is not a requirement.

The reflectivity of the reflective layer 10 (or of any other layer of cooling film 1, or of cooling film 1 as a whole) may be measured so as to obtain e.g., the above-listed values, in general accordance with the methods and equipment referenced in ASTM E1349-06 (2015). Such methods may make use of an integrating sphere and a spectrophotometer that scans over a desired range (e.g., from 400 nm to 2500 nm) at suitable intervals (e.g., 5 nm) in reflection mode, e.g., as outlined in U.S. Provisional Patent Application No. 62/611, 639 and in the resulting International Patent Application Publication WO 2019/130199, both of which are incorporated by reference herein in their entirety. The measurements can then be reported as an average over the wavelength range. In some embodiments, any of the above-listed values may be an average value obtained by weighting the data over the wavelength range according to the weightings of the AM1.5 standard solar spectrum. This can be performed according to procedures outlined, e.g., in ASTM E903.

The above discussions make it clear that in various embodiments, reflective layer 10 may comprise fluorinated polymers, non-fluorinated polymers, or blends thereof, in any desired arrangement. As specified herein, non-fluorinated denotes an entity that includes less than 1% by weight of fluorine atoms. In various embodiments, a non-fluorinated polymer and/or a non-fluorinated layer may include less than 0.5, 0.1, or 0.01% by weight of fluorine atoms.

UV-Protective Layer

Cooling film 1 will comprise at least one UV-protective layer 20. Layer 20, being disposed outward from reflective layer 10, provides UV protection for reflective layer 10 (and, potentially, for one or more additional layers) which may, e.g., enhance the usable lifetime of cooling film 1. That is, layer 20 can advantageously minimize or reduce ultraviolet radiation damage to reflective layer 10.

In some embodiments, a UV-protective layer may be a UV-absorbing layer. A UV-absorbing layer is defined as transmitting less than 20% of radiation over a 30 nm bandwidth in a wavelength range of 300 nm to 400 nm. In the special case in which multiple UV-absorbing layers are present outward of reflective layer 10, this requirement is imposed on the UV-absorbing layers in combination. That is, even if no single layer achieves this threshold, the layers will meet this threshold in combination. In various embodiments, a UV-absorbing layer will transmit (or, multiple layers will transmit in the aggregate) less than 15, 10, or 5% of radiation over a 30 nm bandwidth in a wavelength range of 300 nm to 400 nm.

As used herein, the terminology of a UV-absorbing layer denotes a layer that absorbs, obstructs, dissipates, or otherwise prevents UV radiation from reaching reflective layer 10, by a mechanism or combination of mechanisms that does not rely on reflectance to a significant extent. In various embodiments, a UV-absorbing layer (or set of layers) will be less than 40, 30, 20, 10 or 5 percent reflective of ultraviolet radiation over a majority of the wavelength range of 300-400 nm. UV-absorbing layers as disclosed herein are thus distinguished from reflective layers such as, e.g., vapor-coated metal layers and the like, and are likewise distinguished from reflective items such as reflective multilayer optical films (MOFs) and individual optical layers thereof, and from dielectric mirrors comprised of, e.g., inorganic layers.

In some embodiments, a UV-absorbing layer may include additives that have properties (e.g., wavelength-specific extinction coefficient, absorbance and/or transmittance, etc.) that allow the additive to convert impinging UV radiation to heat which is then dissipated. (Such additives are often referred to as UV-absorbers.) In some embodiments, such a layer may include additives that act synergistically with a UV-absorber to enhance the performance of the UV-absorber. Such additives include many materials that are known as light-stabilizers or UV-stabilizers (e.g., hindered-amine light stabilizers or HALS). Various additives, of various categories, are discussed in detail later herein. Although some such additives may be discussed in the context of being present in a particular layer (e.g., in an adhesive layer or in a hardcoat layer), it is expressly noted that any such additive may be incorporated into any of the layers disclosed herein.

In some embodiments, a UV-absorbing layer may include opaque particles (e.g., inorganic fillers such as titanium dioxide, barium sulfate, kaolinite, and so on) that may be somewhat reflective in nature (different fillers may exhibit varying degrees of reflectivity versus absorption). However, as noted, the primary function of the UV-absorbing layer is to block UV radiation by mechanisms other than reflection. Thus in some embodiments, any such particles may serve primarily to dissipate UV radiation by scattering it. In some embodiments, a UV-absorbing layer may comprise less than 5, 2, 1, 0.5, 0.2, or 0.1 percent by weight of any such inorganic filler.

Any such additive that, when present in a layer 20 and whether acting alone or in concert with some other additive, acts to block (e.g., mitigate or reduce) the passage of UV radiation to reach reflective layer 10 will be referred to herein as a UV-blocking additive. (As noted, such terminology encompasses additives that may be commonly referred to as, e.g., UV-absorbing, UV-scattering, and UV-stabilizing.) Such a layer may be referred to herein for convenience as a UV-absorbing layer. However, this term is used in a general sense; in view of the above discussions, such a layer is not limited to including only additives that operate solely by direct absorption of UV radiation and dissipation of the UV energy in the form of heat. Such a layer may equivalently be termed a UV-blocking layer or a UV-dissipating layer.

In various embodiments, a UV-absorbing layer can be present in cooling film 1, e.g., as an adhesive layer, as a hardcoat layer (e.g., a coated layer), as a single layer of, e.g., fluoropolymer (e.g., an extruded layer), and/or as a layer of a multilayer structure (e.g., as a layer of a stack of coextruded layers), all of which are discussed in various aspects later herein. If desired, multiple UV-absorbing layers may be present, acting in combination as noted above.

In some embodiments, a UV-protective layer 20 may be a UV-reflective layer. A UV-reflective layer is defined herein as being at least 50 percent reflective of ultraviolet radiation (i.e., at normal incidence) over a majority of wavelengths in the range of at least 340 but less than 400 nanometers. In some embodiments, the ultraviolet-reflective layer is at least 60 percent, at least 70 percent, at least 75 percent, at least 80 percent, at least 85 percent, at least 90 percent, at least 95 percent, or even at least 98 percent reflective (i.e., at normal incidence) of ultraviolet radiation over a majority of wavelengths in the range of at least 340 but less than 400 nanometers.

In some embodiments, a UV-protective layer 20 may comprise a UV-reflective multilayer optical film (MOF). Such UV-reflective MOFs generally comprise alternating layers of different polymers with different refractive indexes and appropriate layer thicknesses. The various layers, their thicknesses, compositions, and so on, may be configured so as to ensure that the MOF is UV-reflective. In some embodiments, the MOF may be selectively UV-reflective; e.g., it may reflect UV radiation while passing radiation of other wavelengths, e.g., visible and/or IR radiation.

Figure 12:
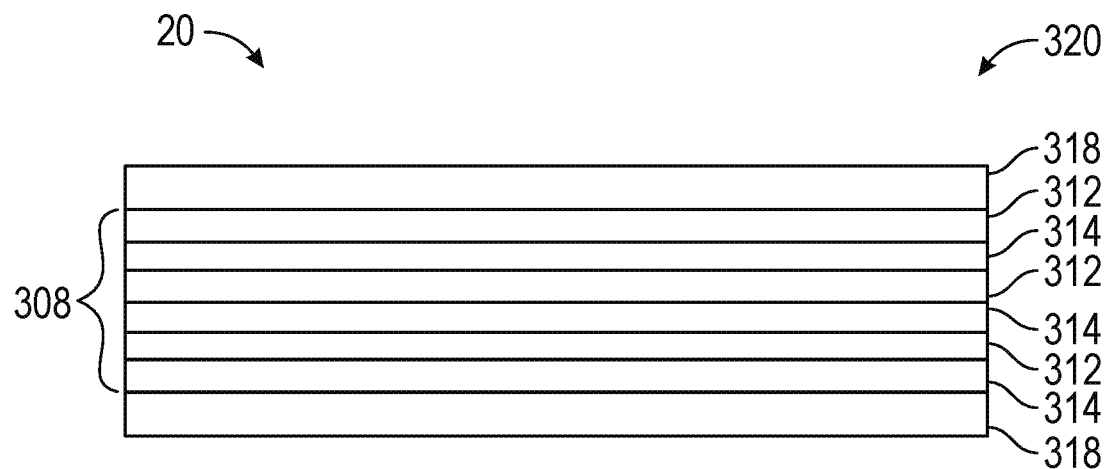
FIG. 12 is a side schematic view of an exemplary ultraviolet-protective layer that is an ultraviolet-reflective layer comprising a multilayer optical film.

FIG. 12 shows an exemplary UV-protective layer 20 in the form of a UV-reflective multilayer optical film 320, which includes one or more first optical layers 312, one or more second optical layers 314, and optionally one or more UV/VIS transparent additional skin layers 318. UV-reflective multilayer optical film 320 includes a multilayer optical stack 308 having alternating layers 312, 314 of at least two materials, typically comprising different polymers. An in-plane index of refraction n1 in one in-plane direction of high refractive index layer 312 is higher than the in-plane index of refraction n2 of low refractive index layer 314 in the same in-plane direction. The difference in refractive index at each boundary between layers 312, 314 causes part of the incident light to be reflected. The transmission and reflection characteristics of multilayer optical film 320 is based on coherent interference of light caused by the refractive index difference between layers 312, 314 and the thicknesses of layers 312, 314. When the effective indices of refraction (or in-plane indices of refraction for normal incidence) differ between layers 312, 314, the interface between adjacent layers 312, 314 forms a reflecting surface. The reflective power of the reflecting surface depends on the square of the difference between the effective indexes of refraction of the layers 312, 314 (e.g., $(n1-n2)^2$). By increasing the difference in the indices of refraction between the layers 312, 314, improved optical power (higher reflectivity), thinner films (thinner or fewer layers), and broader bandwidth performance can be achieved. The refractive index difference in one in-plane direction in an exemplary embodiment is at least about 0.05, preferably greater than about 0.10, more preferably greater than about 0.15 and even more preferably greater than about 0.20.

In some embodiments, the materials of layers 312, 314 inherently have differing indices of refraction. In another embodiment, at least one of the materials of the layers 312, 314 has the property of stress induced birefringence, such that the index of refraction (n) of the material is affected by the stretching process. By stretching multilayer optical film 320 over a range of uniaxial to biaxial orientations, films can be created with a range of reflectivities for differently oriented plane-polarized incident light.

The number of layers in the UV-reflective multilayer optical film 320 is selected to achieve the desired optical properties using the minimum number of layers for reasons of film thickness, flexibility and economy. In the case of reflective films such as mirrors, the number of layers is preferably less than about 2,000, more preferably less than about 1,000, and even more preferably less than about 750.

In some embodiments, the number of layer is at least 150 or 200. In other embodiments, the number of layer is at least 250.

In some embodiments, the UV-reflective multilayer optical film 320 further comprises optional additional non-optical or optical skin layers. Optional skin layers 318 may protect the optical layers 312, 314 from damage, aid in the co-extrusion processing, and/or enhance post-processing mechanical properties. The additional skin layers 318 are often thicker than the optical layers 312, 314. The thickness of the skin layers 318 is usually at least two times, preferably at least four times, and more preferably at least ten times, the thickness of the individual optical layers 312, 314. The thickness of the skin layers 318 may be varied to make a UV-reflective multilayer optical film having a particular thickness. A tie layer (not shown) may optionally be present between the skin layer(s) and the optical layers. Further, an optional top coat may be disposed on the skin layer. Typically, one or more of the additional layers 318 are placed so that at least a portion of the light to be transmitted, polarized, and/or reflected by the optical layers 312, 314, also travels through the additional layers (i.e., the additional layers are placed in the path of light which travels through or is reflected by optical layers 312, 314). To provide a degree of antisoiling properties, one or both of the skin layers (preferably at least the outermost skin layer) comprises fluoropolymer.

Thus in some embodiments, a multilayer optical film may provide UV-protective layer 20; and, in some particular embodiments, the multilayer optical film (e.g., by way of comprising an outermost skin layer that is fluorinated) may provide antisoiling layer 30. This is another example of an arrangement in which a layer (or at least a portion thereof) can serve as both a UV-protective layer 20 and an antisoiling layer 30.

UV-reflective multilayer optical film 320 comprises multiple low/high index pairs of film layers, wherein each low/high index pair of layers 312, 314 has a combined optical thickness of ½ the center wavelength of the band it is designed to reflect. Stacks of such films are commonly referred to as quarterwave stacks. In some embodiments, different low/high index pairs of layers may have different combined optical thicknesses, such as where a broadband reflective optical film is desired.

The various constituent layers of UV-reflective multilayer optical film 320, whether as skin layers or optical layers, are preferably resistant to ultraviolet radiation. Many fluoropolymers are resistant to UV-radiation.

Examples of fluoropolymers that may be used include copolymers of tetrafluoroethylene (TFE), hexafluoropropylene (HFP), and vinylidene fluoride (e.g., available from 3M Company under the trade designation 3M DYNEON THV); a copolymer of TFE, HFP, vinylidene fluoride, and perfluoropropyl vinyl ether (PPVE) (e.g., available from 3M Company under the trade designation 3M DYNEON THVP); a polyvinylidene fluoride (PVDF) (e.g., 3M DYNEON PVDF 6008 from 3M Company); ethylene chlorotrifluoroethylene polymer (ECTFE) (e.g., available as HALAR 350LC ECTFE from Solvay, Brussels, Belgium); an ethylene tetrafluoroethylene copolymer (ETFE) (e.g., available as 3M DYNEON ETFE 6235 from 3M Company); perfluoroalkoxyalkane polymers (PFA); fluorinated ethylene propylene copolymer (FEP); a polytetrafluoroethylene (PTFE); copolymers of TFE, HFP, and ethylene (HTE) (e.g., available as 3M DYNEON HTE1705 from 3M Company). Combinations of fluoropolymers can also be used. In some embodiments, the fluoropolymer includes FEP. In some embodiments, the fluoropolymer includes PFA.

Examples of non-fluorinated polymers that may be used in at least one layer of UV-reflective multilayer optical film 320 include at least one of: polypropylene, polyethylene, polyethylene copolymers, polyethylene methacrylate copolymers, ethylene vinyl acetate copolymers, polymethyl methacrylate, methyl methacrylate copolymers (e.g., copolymers of ethyl acrylate and methyl methacrylate), polyurethanes, extended chain polyethylene polymers (ECPEs), or a combinations thereof. In general, combinations of non-fluorinated polymers can be used.

Exemplary nonfluorinated polymers, especially for use in high refractive index optical layers, may include homopolymers of polymethyl methacrylate (PMMA), such as those available as CP71 and CP80 from Ineos Acrylics, Inc., Wilmington, Del.; and polyethyl methacrylate (PEMA), which has a lower glass transition temperature than PMMA. Additional useful polymers include: copolymers of methyl methacrylate such as, for example, a copolymer made from 75 wt. % methyl methacrylate and 25 wt. % ethyl acrylate, for example, as available from Ineos Acrylics, Inc. as PERSPEX CP63, or as available from Arkema, Philadelphia, Pa. as ALTUGLAS 510, and copolymers of methyl methacrylate monomer units and n-butyl methacrylate monomer units. Blends of PMMA and PVDF may also be used.

Suitable triblock acrylic copolymers are available, for example, as KURARITY LA4285 from Kuraray America Inc., Houston, Tex. Additional suitable polymers for the optical layers, especially for use in the refractive index optical layers, may include at least one of: polyolefin copolymers such as poly(ethylene-co-octene) (e.g., available as ENGAGE 8200 from Dow Elastomers, Midland, Mich.), polyethylene methacrylate (e.g., available as ELVALOY from Dow Elastomers), poly (propylene-co-ethylene) (e.g., available as Z9470 from Atofina Petrochemicals, Inc., Houston, Tex.); and a copolymer of atactic polypropylene and isotactic polypropylene. Materials may be selected based on absorbance or transmittance properties described herein, as well as on refractive index. In general, the greater the refractive index between two materials, the thinner the film can be, which may be desirable for efficient heat transfer.

Multilayer optical films (including reflective polarizers and mirrors) can be made by coextrusion of alternating polymer layers having different refractive indices, for example, as described in U.S. Pat. No. 5,882,774 (Jonza et al.); U.S. Pat. No. 6,045,894 (Jonza et al.); U.S. Pat. No. 6,368,699 (Gilbert et al.); U.S. Pat. No. 6,531,230 (Weber et al.); U.S. Pat. No. 6,667,095 (Wheatley et al.); U.S. Pat. No. 6,783,349 (Neavin et al.); U.S. Pat. No. 7,271,951 B2 (Weber et al); U.S. Pat. No. 7,632,568 (Padiyath et al.); U.S. Pat. No. 7,652,736 (Padiyath et al.); and U.S. Pat. No. 7,952,805 (McGurran et al.); and PCT Publications WO 95/17303 (Ouderkirk et al.) and WO 99/39224 (Ouderkirk et al.).

In one preferred embodiment, the UV-reflective multilayer optical film reflects a wavelength range from 340 to 400 nanometers made with 150 high refractive index layers comprising a methyl methacrylate copolymer (CoPMMA) (e.g., available as PERSPEX CP63 from Lucite International, Cordova, Tenn.) alternating with 150 low refractive index layer comprising a fluoropolymer (e.g., available as 3M DYNEON TI-W221 from 3M Company). In some preferred embodiments, at least one of optical layers 312 and 314 of the UV-reflective multilayer optical film may comprise a UV-blocking additive (e.g., a UV-absorber of the general type described in detail later herein). In some preferred embodiments, at least one of the non-optical layers (e.g., skin layer 318) of the UV-reflective multilayer optical film may comprise a UV-blocking additive, e.g., a UV-absorber.

Antisoiling Layer

The composite cooling film 1 comprises an antisoiling layer 30 which comprises an outwardmost, exposed surface 31. In some embodiments antisoiling layer 30 may be comprised of, or consist of, one or more fluoropolymers (which includes copolymers, blends of multiple fluoropolymers, and so on). Examples of fluoropolymers that may be used include copolymers of tetrafluoroethylene (TFE), hexafluoropropylene (HFP), and vinylidene fluoride (e.g., available from 3M Company under the trade designation 3M DYNEON THV); a copolymer of TFE, HFP, vinylidene fluoride, and perfluoropropyl vinyl ether (PPVE) (e.g., available from 3M Company under the trade designation 3M DYNEON THVP); a polyvinylidene fluoride (PVDF) (e.g., 3M DYNEON PVDF 6008 from 3M Company); ethylene chlorotrifluoroethylene polymer (ECTFE) (e.g., available as HALAR 350LC ECTFE from Solvay, Brussels, Belgium); an ethylene tetrafluoroethylene copolymer (ETFE) (e.g., available as 3M DYNEON ETFE 6235 from 3M Company); perfluoroalkoxyalkane polymers (PFA); fluorinated ethylene propylene copolymer (FEP); a polytetrafluoroethylene (PTFE); copolymers of TFE, HFP, and ethylene (HTE) (e.g., available as 3M DYNEON HTE1705 from 3M Company). Combinations of fluoropolymers can also be used. In some embodiments, the fluoropolymer includes FEP. In some embodiments, the fluoropolymer includes PFA. In some embodiments an antisoiling layer 30 may comprise a single layer (of, e.g., fluoropolymer) that is bonded to a reflective layer 10 by a layer of PSA (which, as noted, may serve as a UV-protective (e.g., UV-absorbing) layer 20), as in the exemplary arrangement of FIG. 1.

In particular embodiments in which cooling film 1 includes a multilayer structure 25 of the general type described earlier herein, structure 25 can include, for example, an outermost, fluoropolymer layer that provides antisoiling layer 30, in combination with one or more inward layers of any suitable composition. Such an inward layer may be a fluoropolymer layer or a non-fluoropolymer layer. Examples of non-fluorinated polymers that may be used include at least one of: polypropylene, polyethylene, polyethylene copolymers, polyethylene methacrylate copolymers, ethylene vinyl acetate copolymers, polymethyl methacrylate, methyl methacrylate copolymers (e.g., copolymers of ethyl acrylate and methyl methacrylate), polyurethanes and crosslinked polyurethanes, extended chain polyethylene polymers (ECPEs), polysiloxanes and crosslinked polysiloxanes, and combinations thereof. In general, combinations of non-fluorinated polymers can be used.

Exemplary nonfluorinated polymers may include homopolymers of polymethyl methacrylate (PMMA), such as those available as CP71 and CP80 from Ineos Acrylics, Inc., Wilmington, Del.; and polyethyl methacrylate (PEMA). Additional useful polymers include: copolymers of methyl methacrylate such as, for example, a copolymer made from 75 wt. % methyl methacrylate and 25 wt. % ethyl acrylate, for example, as available from Ineos Acrylics, Inc. as PERSPEX CP63, or as available from Arkema, Philadelphia, Pa. as ALTUGLAS 510, and copolymers of methyl methacrylate monomer units and n-butyl methacrylate monomer units. It has been found that polymethyl methacrylate and similar polymers may advantageously exhibit the ability to accept high levels of UV-blocking additives thereinto, if it is desired to have a layer of multilayer structure 25 serve as a UV-absorbing layer 20. In some embodiments, blends of PMMA and PVDF may be used.

In embodiments in which cooling film 1 includes a multilayer structure 25, it can be advantageous to have physical and chemical properties on the outward surface and/or layer of the structure that differ from the physical and chemical properties on an inward layer of the structure. For example, highly fluorinated polymers are beneficial for stain, chemical, and dirt resistance, but inherently do not adhere well to other polymers or adhesives. Thus, in a multilayer structure 25, a first, outermost fluoropolymer layer having a high content of tetra-fluoroethylene (TFE) can serve as outermost, antisoiling layer 30. A second fluoropolymer layer may have a lower content of TFE and still adhere well to the first fluoropolymer layer. If the second fluoropolymer layer also comprises vinylidene fluoride (VDF), it will adhere well to other fluoropolymers comprising VDF, such as polyvinylidene fluoride (PVDF). If the second fluoropolymer layer comprises enough VDF, it will adhere well to a non-fluorinated, third polymer layer such as acrylate polymers and even urethane polymers. Such a third polymer layer may be particularly amenable to being loaded with a UV-blocking additive.

Such approaches can thus provide a cooling film of the general type depicted in FIG. 3 (in which a multilayer structure 25 provides first, second and third layers 30, 26 and 20) and discussed elsewhere herein. It will be appreciated that such approaches are not, for example, limited to multilayer structures with, e.g., three total layers and/or with two fluoropolymer layers. Rather, any number of fluoropolymer layers and/or layers of other composition can be used as needed. Useful multi-layer structures comprising fluoropolymer layers, which may prove useful for antisoiling applications (and which may comprise surface texture that further enhances antisoiling properties), are described in U.S. Patent Application Publication No. 2019-0111666, which is incorporated by reference in its entirety herein.

In some embodiments, an exemplary multilayer stack as used in cooling film 1 may comprise first, second and third layers. In particular embodiments, the first layer (an outwardmost layer) comprises a first polymer which comprises at least 35 mol percent tetrafluoroethylene comonomer, at least 15 mole percent vinylidene fluoride comonomer, and at least 5 mol percent hexafluoropropylene comonomer, based on the total mol percent of the first polymer. The second layer comprises a second polymer which comprises at least 50 mol percent vinylidene fluoride comonomer, based on the total mol percent of the second polymer. The third layer comprises a third polymer which comprises at least 50 mol percent methylmethacrylate comonomer, based on the total mol percent of the third polymer. Optionally, the third layer comprises a polyurethane.

In various embodiments, the first polymer of the first layer may comprise at least 40, 45, 50, 55, 60, 65, 70, 75, or even up to 80 mol percent tetrafluoroethylene comonomer, at least 20, 25, 30, 35, 40, 45, or even up to 50 mol percent vinylidene fluoride comonomer, and at least 10, 15, or even at least 20 mol percent hexafluoropropylene comonomer, based on the total mol percent of the first polymer. In some embodiments, the first polymer may comprise at least 0.5, 1, 5, 10, 25, or even 50 mol percent perfluorovinylether comonomer, based on the total mol percent of the first polymer.

Exemplary fluoropolymers for the first layer include those available, for example, from 3M Dyneon, Oakdale, Minn., under the trade designations "FLUOROPLASTIC GRANULES THV221GZ" (39 mol % tetrafluoroethylene, 11 mol % hexafluoropropylene, and 50 mol % vinylidene fluoride), "FLUOROPLASTIC GRANULES THV2030GZ" (46.5 mol % tetrafluoroethylene, 16.5 mol % hexafluoropropylene, 35.5 mol % vinylidene fluoride, and 1.5 mol % perfluoropropyl vinylether), "FLUOROPLASTIC GRANULES THV610GZ" (61 mol % tetrafluoroethylene, 10.5 mol % hexafluoropropylene, and 28.5 mol % vinylidene fluoride), and "FLUOROPLASTIC GRANULES THV815GZ" (72.5 mol % tetrafluoroethylene, 7 mol % hexafluoropropylene, 19 mol % vinylidene fluoride, and 1.5 mol % perfluoropropyl vinylether).

In various embodiments, the second polymer of the second layer may comprise at least 55, 60, 65, 70, 75, 80, 85, 90, 95, or even 100 mol percent vinylidene fluoride comonomer, based on the total mol percent of the second polymer. In some embodiments, the second polymer comprises at least 0.5 (in some embodiments, 0.5 to 50, 1 to 50, 1 to 40, 1 to 30, 1 to 25, 1 to 20, or even 1 to 10) mol percent perfluorovinylether comonomer, at least 0.5 (in some embodiments, in a range from 0.5 to 50, 0.5 to 25, 1 to 25, or even 1 to 20) mol percent hexafluoropropylene comonomer, at least 0.5 (in some embodiments, in a range from 0.5 to 50, 0.5 to 25, 1 to 25, or even 1 to 20) mol percent chlororotrifluoroethylene comonomer, at least 0.1 (in some embodiments, at least 0.2, 0.3, 0.4, 0.5, or even at least 1; in some embodiments, 0.1 to 10, 1 to 20, 1 to 10, or even 1 to 5) wt. % UV-absorbing additive, and/or at least 0.05 (in some embodiments, at least 0.1, 0.3, 0.4, 0.5, or even at least 1; in some embodiments, 0.05 to 5, 0.1 to 5, or even 0.1 to 2) wt. % hindered amine light stabilizer (HALS), based on the total mol percent of the second layer. An exemplary embodiment of the second layer comprises a UVA oligomer and optional HALS oligomer.

Exemplary fluoropolymers for the second layer include those available from 3M Dyneon, Oakdale, Minn., under the trade designations "3M DYNEON FLUOROPLASTIC 6008/0001," "3M DYNEON FLUOROPLASTIC 11010/0000," and "3M DYNEON FLUOROPLASTIC 31508/0001."

In some embodiments, the first and/or second layers of the multilayer fluoropolymer film described herein further comprises inorganic particles (e.g., titanium dioxide, zinc oxide, and/or zirconium dioxide).

In various embodiments, the third polymer of the third layer comprises at least 50 (in some embodiments, 55, 60, 65, 70, 75, 80, 85, 90, 95, or even 100; in some embodiments, in a range from 50 to 100, 75 to 100, or even 85 to 100) mol percent methylmethacrylate comonomer, based on the total mol percent of the third polymer, and/or at least 0.1 (in some embodiments, at least 0.2, 0.3, 0.4, 0.5, 1, 5, 10, 15, 20, or even at least 25; in some embodiments, in a range from 0.1 to 50, 1 to 40, 10 to 40, 10 to 30) butylacrylate comonomer, based on the total weight of the third polymer. In some embodiments, the third layer comprises a polyurethane as the third polymer. In some embodiments, the third layer further comprises at least 0.1 (in some embodiments, at least 0.2, 0.3, 0.4, 0.5, or even at least 1; in some embodiments, 0.1 to 10, 1 to 20, 1 to 10, or even 1 to 5) wt. % UV-absorbing additive, at least 0.05 (in some embodiments, at least 0.1, 0.3, 0.4, 0.5, or even at least 1; in some embodiments, 0.05 to 5, 0.1 to 5, or even 0.1 to 2) wt. % hindered amine light stabilizer (HALS). An exemplary embodiment of the third layer comprises a UVA oligomer and optional HALS oligomer.

Exemplary polymers for the third layer include polymethylmethacrylate (PMMA) (available, for example, from Arkema, Bristol, Pa., under the trade designation "V044"), PMMA-butylacrylate block copolymer (available, for example, from Kuraray Ltd., Osaka, Japan, under the trade designation "LA4285"), and polymer blends thereof.

Multilayer structures of this type are described in further detail in U.S. Patent Application Publication No. 2019-0111666, which is incorporated by reference herein in its entirety. In use of such a multilayer structure in cooling film 1, in many embodiments the first layer may serve as an outermost, antisoiling layer 30, with the third layer serving as a UV-absorbing layer 20, and with the second layer serving as a tie layer therebetween. The outwardmost surface 31 of the first layer may, if desired, be textured to enhance the antisoiling.

Any such multilayer structure 25 may be disposed atop reflective layer 10 in any suitable manner. As noted, in some embodiments a multilayer structure 25 may be coextruded atop reflective layer 10 so that the rearward surface of the inwardmost layer of structure 25 bonds, e.g., melt-bonds, thereto. The composition of an inwardmost layer of multilayer structure 25 may be chosen so as to provide enhanced bonding to a particular reflective layer 10. In some cases, an intervening layer (e.g., a tie layer) may be deposited atop reflective layer 10 to provide an easier surface for multilayer structure 25 to bond to.

In other embodiments multilayer structure 25 may be a pre-made structure (made, e.g., by coextrusion) that is then bonded, e.g., laminated by way of a pressure-sensitive adhesive, to reflective layer 10. (Again, if desired an intervening layer, e.g., a tie layer, may be disposed atop a major surface of reflective layer 10, with the composition of the tie layer being chosen to enhance the bonding of a pressure-sensitive adhesive thereto.)

It is emphasized that a layer that is to be loaded with, e.g., a UV-blocking additive (e.g., a UV-absorbing additive) does not necessarily have to be, for example, a PMMA homopolymer. For example, in some embodiments, a layer may take the form of a copolymer or blend of fluoropolymer and organic polymer (e.g., a blend of PVDF and PMMA), to which is added a UV-blocking additive. In fact, some UV-blocking additives (e.g., UV-absorbing additives) are available that may be compatible with fluoropolymers that have a high fluorine content, even PVDF for example. Such arrangements are disclosed, e.g., in U.S. Pat. No. 9,670,300 and 10,125,251, both of which are incorporated by reference in their entirety herein. Thus, in some embodiments, a layer of fluoropolymer such as, e.g., PVDF may be loaded with a suitable UV-blocking additive. The additive may enhance the inherent UV-resistance of the fluoropolymer and may also render the fluoropolymer layer able to protect a reflective layer positioned rearward of the fluoropolymer layer. In various embodiments, such a UV-protective layer may be a layer of a multilayer structure; or, it may be a single-standalone layer that is not a part of, e.g., an extruded multilayer structure. Such a layer may thus function as both a UV-protective layer 20 and as an antisoiling layer 30, and thus may allow arrangements of the general type depicted in FIG. 2 to be achieved.

In some embodiments, a UV-protective (e.g., UV-absorbing) layer 20 and/or an antisoiling layer 30 may take the form of a coating on the outward side of reflective layer 10 (or on the outward side of any layer present thereon). Such a coating may be obtained by disposing a precursor coating composition atop layer 10 and then solidifying the precursor (e.g., by removal of solvent or any liquid carrier, by crosslinking, and so on) to form the final coating. The disposing of the precursor may be performed in any suitable manner; e.g., knife-coating, gravure-coating, slide-coating, slot-die coating, curtain-coating, and so on. The resulting coating may have a protective character (e.g., providing abrasion resistance, scratch resistance, and so on); such coatings are often referred to as hardcoats, which terminology will be used herein. Numerous coatings of this general type are known in the art including, for example, those described in U.S Pat. Appln. Pubs. 2015/0175479 (Brown et al.), U.S. Pat. No. 6,277,485 (Invie et al.) and U.S. Pat. No. 6,991,826 (Pellerite et al.), and WO 02/12404 (Liu et al.) Commercially available hardcoats include products available under the trade designation SHIKOH from Mitsubishi Chemicals, and products available under the trade designation PERMA-NEW from California Hardcoating Company, Chula Vista, Calif. Some such hardcoats may be of the general type described in U.S. Pat. No. 6,265,029.

In some embodiments, such a hardcoat may serve only as an antisoiling layer 30 rather than as a UV-absorbing layer that protects reflective layer 10. In such embodiments, little or no UV-blocking additive may be present within layer 30 (e.g., only such an amount, if any, as may be needed to stabilize layer 30 itself). If desired, in some embodiments the outward surface 31 of such a hardcoat may be textured to enhance the antisoiling properties of the hardcoat. In some embodiments, such a hardcoat may serve as both a UV-absorbing layer 20 and as an antisoiling layer 30 (as in the exemplary design of FIG. 2). In such embodiments, the hardcoat may include an appropriate amount and type of any suitable UV-blocking additive(s), including any of the UV-blocking additives specifically mentioned herein. If desired, the hardcoat may comprise a textured surface 31 for the purposes noted above.

In some embodiments, the hardcoat may be based on a coating composition that relies at least in part on methacrylate materials. For example, in some embodiments the coating composition may include a poly(methyl methacrylate) (PMMA) polymer, which may be a homopolymer or copolymer. The PMMA polymer or copolymer has a weight average molecular weight of at least 50,000 grams per mole. In some embodiments, the PMMA polymer or copolymer has a weight average molecular weight of at least 75,000 grams per mole, 100,000 grams per mole, 120,000 grams per mole, 125,000 grams per mole, 150,000 grams per mole, 165,000 grams per mole, or 180,000 grams per mole. The PMMA polymer or copolymer may have a weight average molecular weight of up to 500,000 grams per mole, in some embodiments, up to 400,000 grams per mole, and in some embodiments, up to 250,000 grams per mole.

Weight average molecular weights can be measured, for example, by gel permeation chromatography (i.e., size exclusion chromatography (SEC)) using techniques known in the art.

Useful copolymers of PMMA include those made from a $C_2$-$C_8$ alkyl acrylate or methacrylate or a $C_3$-$C_8$ cycloalkyl acrylate or methacrylate in combination with methyl methacrylate. In some embodiments, the copolymer of PMMA includes at least one of ethyl acrylate, ethyl methacrylate, butyl acrylate, or butyl methacrylate. In some embodiments, the copolymer is made from starting monomers including methylmethacrylate in a range from 50 weight percent to 90 weight percent (in some embodiments from 60 to 85 weight percent) and a $C_2$-$C_8$ alkyl acrylate or methacrylate or a $C_3$-$C_8$ cycloalkyl acrylate or methacrylate in a range from 10 weight percent to 50 weight percent (in some embodiments from 15 to 40 weight percent), based on the total weight of the monomers. In some of these embodiments, the $C_2$-$C_8$ alkyl acrylate or methacrylate or $C_3$-$C_8$ cycloalkyl acrylate or methacrylate is ethyl acrylate or n-butyl methacrylate. Useful copolymers of PMMA are commercially available, for example, from The Dow Chemical Company, Midland, Mich., under the trade designation "PARALOID" and from Lucite International, Inc., Memphis, Tenn., under the trade designation "PERSPEX" and "ELVACITE". In some embodiments, employing a copolymer of methyl methacrylate and n-butyl methyacrylate in the coating compositions may improve the abrasion resistance of the resulting hardcoat.

The PMMA polymer or copolymer is a linear polymer or copolymer and is typically non-functional. That is, the PMMA polymer or copolymer does not typically contain reactive functional groups such as carboxylic acids, sulfonic acids, amino groups, and polymerizable carbon-carbon double bonds.

The coating composition according to the present disclosure may include, e.g., an alkylene diacrylate, alkylene dimethacrylate, cycloalkylene diacrylate, or cycloalkylenedimethacrylate. The alkylene diacrylate, alkylene dimethacrylate, cycloalkylene diacrylate, or cycloalkylenedimethacrylate can conveniently be a liquid at room temperature. The alkylene diacrylate or dimethacrylate is typically a $C_2$-$C_{10}$ alkylene diacrylate or dimethacrylate or a $C_4$-$C_6$ cycloalkylene diacrylate or dimethacrylate with no substituents on the alkylene or the cycloalkylene group. The alkylene group in the diacrylate or dimethacrylate, by definition, does not include any heteroatoms or functional groups that interrupt the carbon chain, and the cycloalkylene group in the diacrylate or dimethacrylate, by definition, does not include any heteroatoms in the ring. The alkylene group may be straight chain or branched. Without wanting to be bound by theory, it is believed branching in the alkylene group may result in a cured coating that has a lower modulus, which can increase the abrasion resistance of the cured coating compositions in some embodiments. Examples of useful difunctional acrylates and methacrylates include hexanediol diacrylate, hexanediol dimethacrylate, neopentyl glycol diacrylate, and neopentyl glycol dimethacrylate. It has been found that the coating compositions disclosed herein have good adhesion to many polymeric substrates after curing even in the absence of, e.g., alkyleneoxy groups in the acrylic monomers.

The alkylene diacrylate, alkylene dimethacrylate, cycloalkylene diacrylate, and/or cycloalkylenedimethacrylate may provide, e.g., at least 80 percent by weight of the monomer in the coating composition. In some embodiments, the alkylene diacrylate, alkylene dimethacrylate, cycloalkylene diacrylate, and/or cycloalkylenedimethacrylate provide at least 85, 90, 95, 96, 97, 98, 99, or even 100 percent by weight of the monomer. In other words, monomers (e.g., acrylic monomers) other than the alkylene diacrylate, alkylene dimethacrylate, cycloalkylene diacrylate, and/or cycloalkylenedimethacrylate make up not more than (e.g., less than) 20, 15, 10, 5, 4, 3, 2, or 1 percent by weight, based on the total weight of the monomer in the coating composition. In some embodiments, the coating composition may be considered to be substantially free of monomers (e.g., acrylic monomers) other than the alkylene diacrylate, alkylene dimethacrylate, cycloalkylene diacrylate, and/or cycloalkylenedimethacrylate. In some embodiments, the monomer in the coating composition may be considered to consist of an alkylene diacrylate, an alkylene dimethacrylate, a cycloalkylene diacrylate, a cycloalkylenedimethacrylate, or a combination thereof.

In many embodiments, the coating compositions disclosed herein therefore do not have significant amounts of monofunctional acrylates or methacrylates (e.g., more than about 15 percent by weight, based on the total weight of the monomer in the coating composition). In some embodiments, the monomer includes not more than 15, 10, 5, 4, 3, 2, or 1 percent by weight monofunctional acrylate or methacrylate, based on the total weight of the monomer in the coating composition.

In many embodiments, the coating compositions disclosed herein also do not have significant amounts of tri-, tetra-, or higher functional acrylates or methacrylates (e.g., more than about 10 percent by weight, based on the total weight of the monomer in the coating composition). In some embodiments, the monomer includes not more than 7.5, 5, 4, 3, 2, or 1 percent by weight tri-, tetra-, or higher functional acrylate or methacrylate, based on the total weight of the monomer in the coating composition.

In some embodiments, the hardcoat prepared from the coating composition disclosed herein has an elongation of less than 50% (in some embodiments, less than 25% or less than 10%). In some embodiments, these acrylate-based coating compositions do not include urethane acrylates or include not more than 10, 5, 3, or 1 percent by weight of a urethane acrylate, based on the total weight of the monomer in the coating composition. Also, by definition, the alkylene or cycloalkylene diacrylates or dimethacrylates are not prepared from urethanes and are free of urethane and urea groups.

In the coating compositions disclosed herein, a variety of ratios of the monomer comprising at least one of alkylene diacrylate, alkylene dimethacrylate, cycloalkylene diacrylate, or cycloalkylenedimethacrylate to the poly(methyl methacrylate) polymer or copolymer may be useful. In any of the embodiments of the PMMA polymer or copolymer or the monomer described above, the weight ratio of the monomer comprising at least one of alkylene diacrylate, alkylene dimethacrylate, cycloalkylene diacrylate, or cycloalkylenedimethacrylate to the poly(methyl methacrylate) polymer or copolymer may be in a range from 0.75:1 to 15:1. Also, in any of the aforementioned embodiments, the monomer may be present in the composition in a range from 20 percent by weight to 90 percent by weight (in some embodiments, 20 percent by weight to 80 percent by weight or 23 percent by weight to 75 percent by weight), based on the total weight of the non-volatile components of the composition. The PMMA polymer or copolymer may be present in the composition in a range from 2 percent by weight to 40 percent by weight (in some embodiments, 4 percent by weight to less than 40 percent by weight such as 39, 38, or 37 percent by weight) based on the total weight of the non-volatile components of the composition. In some embodiments, for example, embodiments in which the coating composition does not contain any filler, the weight ratio of the monomer comprising at least one of alkylene diacrylate, alkylene dimethacrylate, cycloalkylene diacrylate, or cycloalkylenedimethacrylate to the poly(methyl methacrylate) polymer or copolymer is in a range from 0.75:1 to 5:1, 1:1 to 4:1, or 1.5:1 to 3:1. In any of these embodiments, the monomer may be present in the composition in a range from 40 percent by weight to 90 percent by weight (in some embodiments, 41, 42, 43, 44, or 45 percent by weight to 90 or 80 percent by weight), based on the total weight of the non-volatile components of the composition, and the PMMA polymer or copolymer may be present in the composition in a range from 20 percent by weight to 40 percent by weight (in some embodiments, 20 percent by weight to less than 40 percent by weight such as 39, 38, or 37 percent by weight) based on the total weight of the non-volatile components of the composition. In some embodiments, for example, embodiments in which the coating composition includes filler as described in further detail below, the weight ratio of the monomer comprising at least one of alkylene diacrylate, alkylene dimethacrylate, cycloalkylene diacrylate, or cycloalkylenedimethacrylate to the poly(methyl methacrylate) polymer or copolymer is in a range from 0.75:1 to 15:1, 0.75:1 to 12.5:1, or 1:1 to 10:1. Acrylate-based hardcoats are described in further detail in U.S. patent Ser. No. 10/072,173, which is incorporated by reference in its entirety herein.

Regardless of the particular polymeric composition, in some embodiments a hardcoat may include inorganic particles such as, e.g., inorganic oxide particles (e.g., silica, zirconia, titania, antimony oxides, alumina, and so on). In various embodiments any such particles may have an average size of up to, e.g., 500 nanometers. Such particles may, for example, enhance the strength, mechanical durability, abrasion resistance, scratch resistance, etc., of the hardcoat. In some embodiments, such particles may enhance the ability of the hardcoat to be textured (e.g., to further enhance antisoiling), e.g., by removal of organic polymeric material (e.g., by etching) with the inorganic particles remaining in place thus imparting the surface of the hardcoat with texture. Various inorganic particles that may find use in a hardcoat are discussed in detail in the above-cited '173 US patent. The '173 patent also includes an extensive discussion of UV-blocking (e.g., UV-absorbing) additives that may be incorporated into a hardcoat; it will be understood that any such additive(s) (and, in general, any of the additives disclosed elsewhere herein) may be included in a hardcoat.

It will be understood that the above-described acrylate-based hardcoats are merely exemplary and that the composition may be varied in some circumstances. In general, such a hardcoat (whether serving as a UV-absorbing layer, an antisoiling layer, or both), is not limited to being an acrylate-based composition. Other possibly suitable compositions (exhibiting, e.g., scratch resistance and the like) are disclosed, e.g., in U.S. Pat. No. 9,523,516, which is incorporated by reference in its entirety herein.

Regardless of the particular composition, a hardcoat layer will be distinguished from any layer that fails to exhibit hardness, wear and durability properties commensurate with the layer functioning as a hardcoat. In some embodiments a hardcoat layer as disclosed herein may exhibit a Pencil Hardness (as obtained in general accordance with the procedures outlined in ASTM Test Method D3363-05(2011) e2, e.g., using a GARDCO 5021 PENCIL HARDNESS TESTER or the equivalent) of at least 3H, 5H, 7H, or 9H. Materials such as pressure-sensitive adhesive layers and the like, by definition are not hardcoats as disclosed herein.

In some embodiments, a hardcoat layer (e.g., a UV-absorbing, textured hardcoat that provides both UV-protection and antisoiling) may be disposed on a suitable substrate (e.g., a layer of MYLAR film), with a reflective nonporous inorganic-particle-filled organic polymeric layer being disposed on the rear side of the substrate. For example, such a reflective layer may be painted onto the rear surface of the substrate.

Textured Antisoiling Surface

In some embodiments, the outward facing surface 31 of antisoiling layer 30 (i.e., opposite the reflective layer 10) may be textured so as to be microstructured and/or nano-structured over some or all of its surface; for example, as described in U.S. Provisional Patent Application No. 62/611,636 and in the resulting PCT International Application Publication No. WO 2019/130198, both of which are incorporated by reference in their entirety herein. The use of such micro and/or nano structuring for the specific purpose of enhancing antisoiling of a cooling film is discussed in U.S. Provisional Patent Application No. 62/855,392, which is incorporated by reference in its entirety herein.

In some embodiments, the nanostructure may be superimposed on the microstructure on the surface of the antisoiling layer. In some such embodiments, the antisoiling layer has a major surface (i.e., an antisoiling surface) that includes micro-structures and/or nano-structures. The micro-structures may be arranged as a series of alternating micro-peaks and micro-spaces. The size and shape of the micro-spaces between micro-peaks may mitigate the adhesion of dirt particles to the micro-peaks. The nano-structures may be arranged as at least one series of nano-peaks disposed on at least the micro-spaces. The micro-peaks may be more durable to environmental effects than the nano-peaks. Because the micro-peaks are spaced only by a micro-space, and the micro-spaces are significantly taller than the nano-peaks, the micro-peaks may serve to protect the nano-peaks on the surface of the micro-spaces from abrasion.

In reference to the antisoiling layer, the term or prefix "micro" refers to at least one dimension defining a structure or shape being in a range from 1 micrometer to 1 millimeter. For example, a microstructure may have a height or a width that is in a range from 1 micrometer to 1 millimeter.

As used herein, the term or prefix "nano" refers to at least one dimension defining a structure or a shape being less than 1 micrometer. For example, a nano-structure may have at least one of a height or a width that is less than 1 micrometer.

Figure 4A:
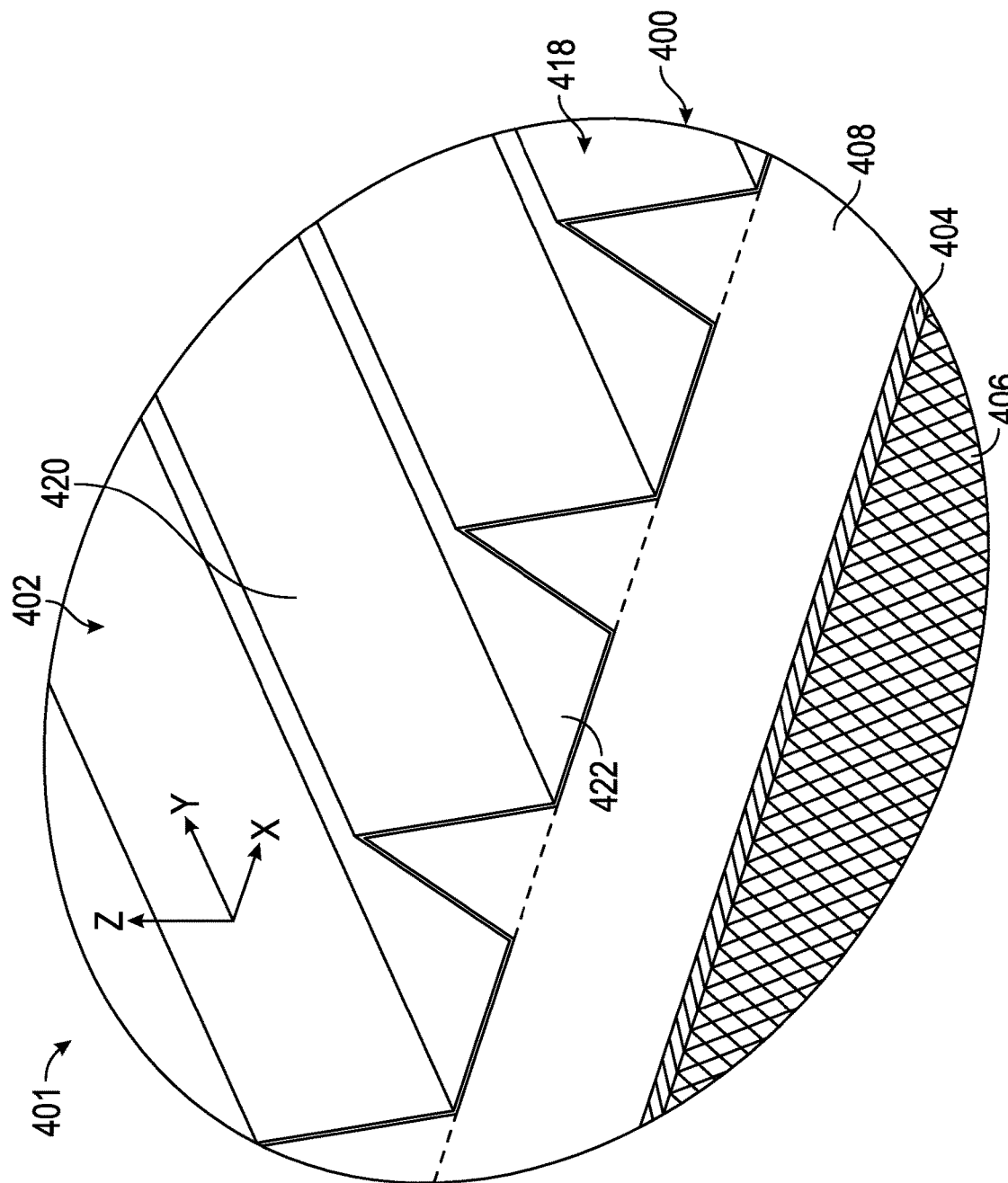
FIGS. 4A, 4B, and 4C are views of an exemplary antisoiling surface structure having micro-structures.
Figure 4B:
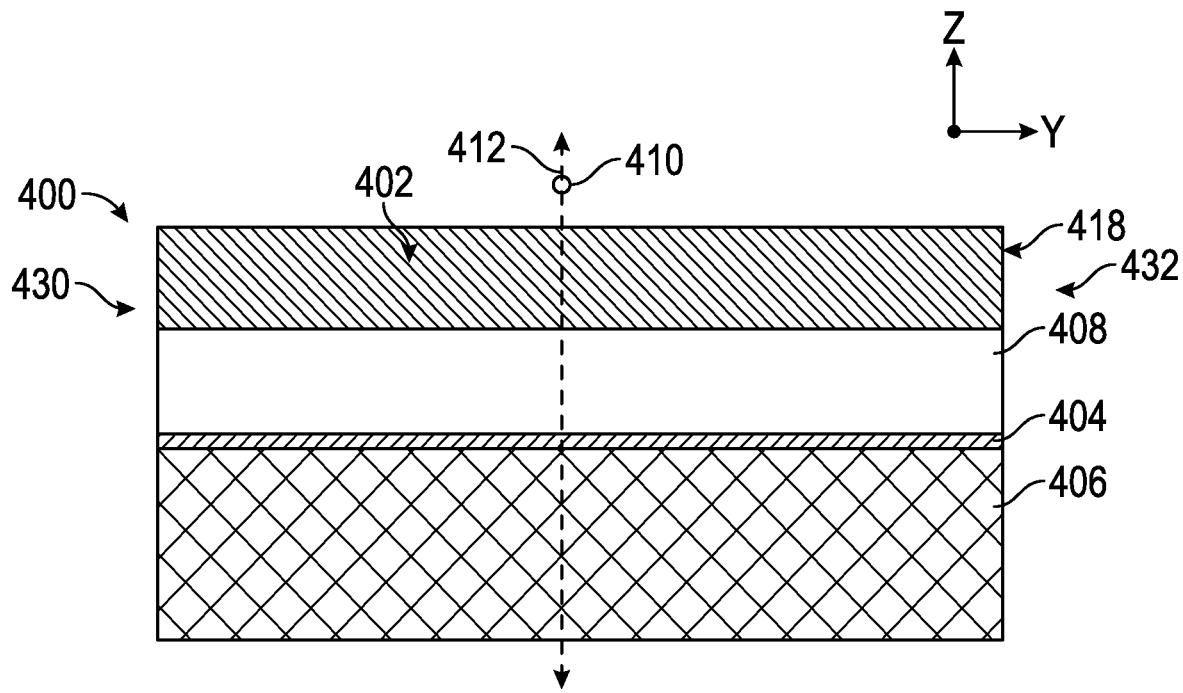
Figure 4C:
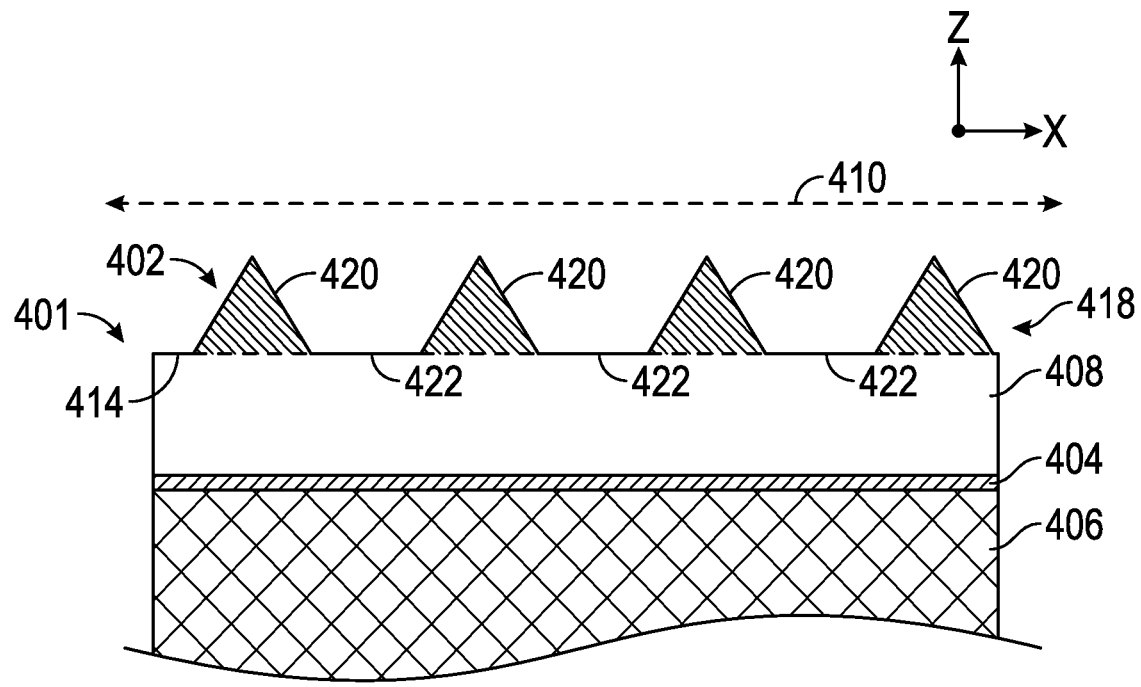

FIGS. 4A, 4B, and 4C show cross-sections 400, 401 of an antisoiling surface structure, shown as antisoiling layer 408 having antisoiling surface 402 defined by a series of micro-structures 418. In particular, FIG. 4A shows a perspective view of the cross section 401 relative to xyz-axes. FIG. 4C shows cross section 401 in an xz-plane parallel to axis 410. FIG. 4B shows cross section 400 in a yz-plane orthogonal to cross section 401 and orthogonal to axis 410. Antisoiling surface 402 is depicted in FIGS. 4A-4C as if antisoiling layer 408 were lying on a flat horizontal surface. Antisoiling layer 408, however, may be flexible and may conform to substrates that are not flat.

In some embodiments, micro-structures 418 are formed in antisoiling layer 408. Micro-structures 418 and remaining portions of antisoiling layer 408 below the micro-structures may be formed of the same material. Antisoiling layer 408 may be formed of any suitable material capable of defining micro-structures 418, which may at least partially define antisoiling surface 402. Antisoiling layer 408 may be transparent to various frequencies of light. In at least one embodiment, antisoiling layer 408 may be non-transparent, or even opaque, to various frequencies of light. In some embodiments, Antisoiling layer 408 may include, or be made of, an UV stable material, and/or may include a UV-blocking additive. In some embodiments, antisoiling layer 408 may include a polymer material such as a fluoropolymer or a polyolefin polymer.

Antisoiling surface 402 may extend along axis 410, for example, parallel or substantially parallel to the axis. Plane 412 may contain axis 410, for example, parallel or intersecting such that axis 410 is in plane 412. Both axis 410 and plane 412 may be imaginary constructs used herein to illustrate various features related to antisoiling surface 402. For example, the intersection of plane 412 and antisoiling surface 402 may define line 414 describing a cross-sectional profile of the surface as shown in FIG. 4C that includes micro-peaks 420 and micro-spaces 422 as described herein in more detail. Line 414 may include at least one straight segment or curved segments.

Line 414 may at least partially define series of micro-structures 418. micro-structures 418 may be three-dimensional (3D) structures disposed on antisoiling layer 408, and line 414 may describe only two dimensions (e.g., height and width) of that 3D structure. As can be seen in FIG. 4B, micro-structures 418 may have a length that extends along surface 402 from one side 430 to another side 432.

Micro-structures 418 may include a series of alternating micro-peaks 420 and micro-spaces 422 along, or in the direction of, axis 410, which may be defined by, or included in, line 414. The direction of axis 410 may coincide with a width dimension. Micro-spaces 422 may each be disposed between pair of micro-peaks 420. In other words, plurality of micro-peaks 420 may be separated from one another by at least one micro-spaces 422. In at least one embodiments, at least one pair of micro-peaks 420 may not include micro-space 422 in-between. Pattern of alternating micro-peaks 420 and micro-spaces 422 may be described as a "skipped tooth riblet" (STR). Each of micro-peaks 420 and micro-spaces 422 may include at least one straight segment or curved segment.

A slope of line 414 (e.g., rise over run) may be defined relative to the direction of axis 410 as an x-coordinate (run) and relative to the direction of plane 412 as a y-axis (rise).

A maximum absolute slope may be defined for at least one portion of line 414. As used herein, the term "maximum absolute slope" refers to a maximum value selected from the absolute value of the slopes throughout a particular portion of line 414. For example, the maximum absolute slope of one micro-space 422 may refer to a maximum value selected from calculating the absolute values of the slopes at every point along line 414 defining the micro-space.

A line defined the maximum absolute slope of each micro-space 422 may be used to define an angle relative to axis 410. In some embodiments, the angle corresponding to the maximum absolute slope may be at most 30 (in some embodiments, at most 25, 20, 15, 10, 5, or even at most 1) degrees. In some embodiments, the maximum absolute slope of at least some (in some embodiments, all) of micro-peaks 420 may be greater than the maximum absolute slope of at least some (in some embodiments, all) of micro-spaces 422.

In some embodiments, line 414 may include boundary 416 between each adjacent micro-peak 420 and micro-space 422. Boundary 416 may include at least one of straight segment or curved segment. Boundary 416 may be a point along line 414. In some embodiments, boundary 416 may include a bend. The bend may include the intersection of two segments of line 414. The bend may include a point at which line 414 changes direction in a locale (e.g., a change in slope between two different straight lines). The bend may also include a point at which line 414 has the sharpest change in direction in a locale (e.g., a sharper turn compared to adjacent curved segments). In some embodiments, boundary 416 may include an inflection point. An inflection point may be a point of a line at which the direction of curvature changes.

Figure 5:
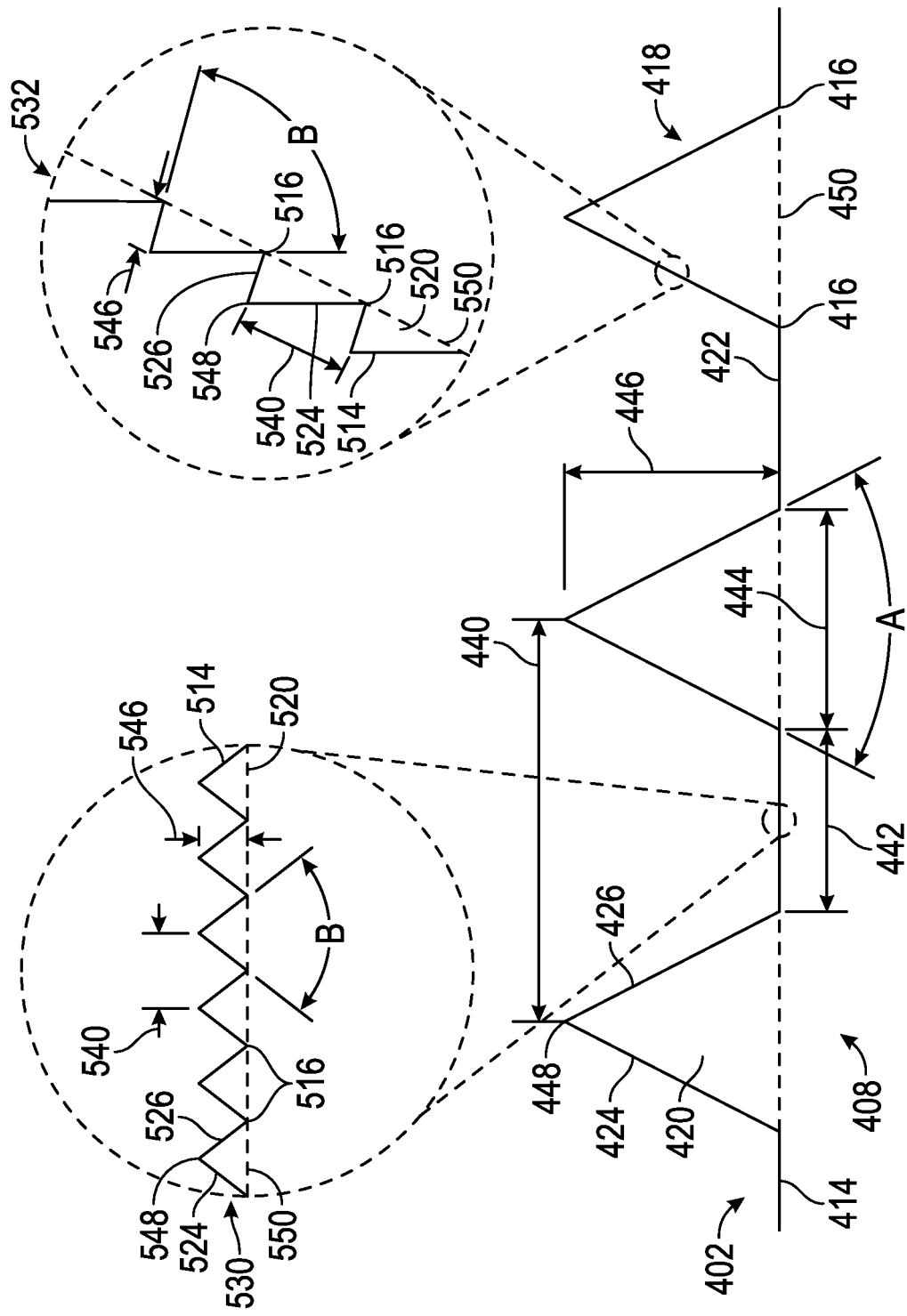
FIG. 5 is a cross-sectional illustration of various nano-structures of the antisoiling surface structure of FIGS. 4A-4C in an xz-plane.

FIG. 5 shows antisoiling surface 402 of antisoiling layer 408 with nano-structures 530, 532, which are visible in two magnified overlays. At least one micro-peak 420 may include at least one first micro-segment 424 or at least one second micro-segment 426. Micro-segments 424, 426 may be disposed on opposite sides of apex 448 of micro-peak 420. Apex 448 may be, for example, the highest point or local maxima of line 414. Each micro-segment 424, 426 may include at least one: straight segment or curved segment.

Line 414 defining first and second micro-segments 424, 426 may have a first average slope and a second average slope, respectively. The slopes may be defined relative to baseline 450 as an x-axis (run), wherein an orthogonal direction is the z-axis (rise).

As used herein, the term "average slope" refers to an average slope throughout a particular portion of a line. In some embodiments, the average slope of first micro-segment 424 may refer to the slope between the endpoints of the first micro-segment. In some embodiments, the average slope of first micro-segment 424 may refer to an average value calculated from the slopes measured at multiple points along the first micro-segment.

In general, the micro-peak first average slope may be defined as positive and the micro-peak second average slope may be defined as negative. In other words, the first average slope and the second average slope have opposite signs. In some embodiments, the absolute value of the micro-peak first average slope may be equal to the absolute value of the micro-peak second average slope. In some embodiments, the absolute values may be different. In some embodiments, the absolute value of each average slope of micro-segments 424, 426 may be greater than the absolute value of the average slope of micro-space 422.

Angle A of micro-peaks 420 may be defined between the micro-peak first and second average slopes. In other words, the first and second average slopes may be calculated and then an angle between those calculated lines may be determined. For purposes of illustration, angle A is shown as relating to first and second micro-segments 424, 426. In some embodiments, however, when the first and second micro-segments are not straight lines, the angle A may not necessarily be equal to the angle between two micro-segments 424, 426.

Angle A may be in a range to provide sufficient antisoiling properties for surface 202. In some embodiments, angle A may be at most 120 (in some embodiments, at most 110, 100, 95, 90, 85, 80, 75, 70, 65, 60, 55, 50, 45, 40, 35, 30, 25, 20, or even at most 10) degrees. In some embodiments, angle A is at most 85 (in some embodiments, at most 75) degrees. In some embodiments, angle A is, at the low end, at least 30 (in some embodiments, at least 25, 40, 45, or even at least 50) degrees. In some embodiments, angle A is, at the high end, at most 75 (in some embodiments, at most 60, or even at most 55) degrees.

Micro-peaks 420 may be any suitable shape capable of providing angle A based on the average slopes of micro-segments 424, 426. In some embodiments, micro-peaks 420 are generally formed in the shape of a triangle. In some embodiments, micro-peaks 420 are not in the shape of a triangle. The shape may be symmetrical across a z-axis intersecting apex 448. In some embodiments, the shape may be asymmetrical.

Each micro-space 422 may define micro-space width 242. Micro-space width 442 may be defined as a distance between corresponding boundaries 416, which may be between adjacent micro-peaks 420.

A minimum for micro-space width 442 may be defined in terms of micrometers. In some embodiments, micro-space width 442 may be at least 10 (in some embodiments, at least 20, 25, 30, 40, 50, 60, 70, 75, 80, 90, 100, 150, 200, or even at least 250) micrometers. In some applications, micro-space width 442 is, at the low end, at least 50 (in some embodiments, at least 60) micrometers. In some applications, micro-space width 442 is, at the high end, at most 90 (in some embodiments, at most 80) micrometers. In some applications, micro-space width 442 is 70 micrometers.

As used herein, the term "peak distance" refers to the distance between consecutive peaks, or between the closest pair of peaks, measured at each apex or highest point of the peak.

Micro-space width 442 may also be defined relative to micro-peak distance 440. In particular, a minimum for micro-space width 442 may be defined relative to corresponding micro-peak distance 440, which may refer to the distance between the closest pair of micro-peaks 420 surrounding micro-space 422 measured at each apex 448 of the micro-peaks. In some embodiments, micro-space width 442 may be at least 10% (in some embodiments, at least 20%, 25%, 30%, 40%, 50%, 60%, 70%, 80%, or even at least 90%) of the maximum for micro-peak distance 440. In some embodiments, the minimum for micro-space width 442 is, at the low end, at least 30% (in some embodiments, at least 40%) of the maximum for micro-peak distance 440. In some embodiments, the minimum for micro-space width 442 is, at the high end, at most 60% (in some embodiments, at most 50%) of the maximum for micro-peak distance 440. In some embodiments, micro-space width 442 is 45% of micro-peak distance 440.

A minimum the micro-peak distance 440 may be defined in terms of micrometers. In some embodiments, micro-peak distance 440 may be at least 1 (in some embodiments, at least 2, 3, 4, 5, 10, 25, 50, 75, 100, 150, 200, 250, or even at least 500) micrometers. In some embodiments, micro-peak distance 440 is at least 100 micrometers.

A maximum for micro-peak distance 440 may be defined in terms of micrometers. Micro-peak distance 440 may be at most 1000 (in some embodiments, at most 900, 800, 700, 600, 500, 400, 300, 250, 200, 150, 100, or even at most 50) micrometers. In some embodiments, micro-peak distance 440 is, at the high end, at most 200 micrometers. In some embodiments, micro-peak distance 440 is, at the low end, at least 100 micrometers. In some embodiments, micro-peak distance 440 is 150 micrometers.

Each micro-peak 420 may define micro-peak height 446. Micro-peak height 446 may be defined as a distance between baseline 550 and apex 448 of micro-peak 420. A minimum may be defined for micro-peak height 446 in terms of micrometers. In some embodiments, micro-peak height 446 may be at least 10 (in some embodiments, at least 20, 25, 30, 40, 50, 60, 70, 80, 90, 100, 150, 200, or even at least 250) micrometers. In some embodiments, micro-peak height 446 is at least 60 (in some embodiments, at least 70) micrometers. In some embodiments, micro-peak height 446 is 80 micrometers.

Plurality of nano-structures 530, 532 may be defined at least partially by line 414. Plurality of nano-structures 530 may be disposed on at least one or micro-space 422. In particular, line 514 defining nano-structures 530 may include at least one series of nano-peaks 520 disposed on at least one micro-space 422. In some embodiments, at least one series of nano-peaks 520 of plurality of nano-structures 532 may also be disposed on at least one micro-peak 420.

Due to at least their difference in size, micro-structures 418 may be more durable than nano-structures 530, 532 in terms of abrasion resistance. In some embodiments, plurality of nano-structures 532 are disposed only on micro-spaces 422 or at least not disposed proximate to or adjacent to apex 448 of micro-peaks 420.

Each nano-peak 520 may include at least one of first nano-segment 524 and second nano-segment 526. Each nano-peak 520 may include both nano-segments 524, 526. Nano-segments 524, 526 may be disposed on opposite sides of apex 548 of nano-peak 520.

First and second nano-segments 524, 526 may define a first average slope and a second average slope, respectively, which describe line 514 defining the nano-segment. For nano-structures 530, 532, the slope of line 514 may be defined relative to baseline 550 as an x-axis (run), wherein an orthogonal direction is the z-axis (rise).

In general, the nano-peak first average slope may be defined as positive and the nano-peak second average slope may be defined as negative, or vice versa. In other words, the first average slope and the second average slope at least have opposite signs. In some embodiments, the absolute value of the nano-peak first average slope may be equal to the absolute value of the nano-peak second average slope (e.g., nano-structures 530). In some embodiments, the absolute values may be different (e.g., nano-structures 532).

Angle B of nano-peaks 520 may be defined between lines defined by the nano-peak first and second average slopes. Similar to angle A, angle B as shown is for purposes of illustration and may not necessarily equal to any directly measured angle between nano-segments 524, 526.

Angle B may be a range to provide sufficient antisoiling properties for surface 402. In some embodiments, angle B may be at most 120 (in some embodiments, at most 110, 100, 90, 85, 80, 75, 70, 65, 60, 55, 50, 45, 40, 35, 30, 25, 20, or even at most 10) degrees. In some embodiments, angle B is, at the high end, at most 85 (in some embodiments, at most 80, or even at most 75) degrees. In some embodiments, angle B is, at the low end, at least 55 (in some embodiments, at least 60, or even at least 65) degrees. In some embodiments, angle B is 70 degrees.

Angle B may be the same or different for each nano-peak 520. For example, in some embodiments, angle B for nano-peaks 520 on micro-peaks 420 may be different than angle B for nano-peaks 520 on micro-spaces 422.

Nano-peaks 520 may be any suitable shape capable of providing angle B based on lines defined by the average slopes of nano-segments 524, 526. In some embodiments, nano-peaks 520 are generally formed in the shape of a triangle. In at least one embodiments, nano-peaks 520 are not in the shape of a triangle. The shape may be symmetrical across apex 548. For example, nano-peaks 520 of nano-structures 530 disposed on micro-spaces 422 may be symmetrical. In at least one embodiments, the shape may be asymmetrical. For example, nano-peaks 520 of nano-structures 532 disposed on micro-peaks 420 may be asymmetrical with one nano-segment 524 being longer than other nano-segment 526. In some embodiments, nano-peaks 520 may be formed with no undercutting.

Each nano-peak 520 may define nano-peak height 546. Nano-peak height 546 may be defined as a distance between baseline 550 and apex 548 of nano-peak 520. A minimum may be defined for nano-peak height 546 in terms of nanometers. In some embodiments, nano-peak height 546 may be at least 10 (in some embodiments, at least 50, 75, 100, 120, 140, 150, 160, 180, 200, 250, or even at least 500) nanometers.

In some embodiments, nano-peak height 546 is at most 250 (in some embodiments, at most 200) nanometers, particularly for nano-structures 530 on micro-spaces 422. In some embodiments, nano-peak height 546 is in a range from 100 to 250 (in some embodiments, 160 to 200) nanometers. In some embodiments, nano-peak height 546 is 180 nanometers.

In some embodiments, nano-peak height 546 is at most 160 (in some embodiments, at most 140) nanometers, particularly for nano-structures 532 on micro-peaks 420. In some embodiments, nano-peak height 546 is in a range from 75 to 160 (in some embodiments, 100 to 140) nanometers. In some embodiments, nano-peak height 546 is 120 nanometers.

As used herein, the terms "corresponding micro-peak" or "corresponding micro-peaks" refer to micro-peak 420 upon which nano-peak 520 is disposed or, if the nano-peak is disposed on corresponding micro-space 422, refers to one or both of the closest micro-peaks that surround that micro-space. In other words, micro-peaks 420 that correspond to micro-space 422 refer to the micro-peaks in the series of micro-peaks that precede and succeed the micro-space.

Nano-peak height 546 may also be defined relative to micro-peak height 446 of corresponding micro-peak 420. In some embodiments, corresponding micro-peak height 446 may be at least 10 (in some embodiments, at least 50, 100, 150, 200, 300, 400, 500, 600, 700, 800, 900, or even at least 1000) times nano-peak height 546. In some embodiments, corresponding micro-peak height 446 is, at the low end, at least 300 (in some embodiments, at least 400, 500, or even at least 600) times nano-peak height 546. In some embodiments, corresponding micro-peak height 446 is, at the high end, at most 900 (in some embodiments, at most 800, or even at most 700) times nano-peak height 546.

Nano-peak distance 540 may be defined between nano-peaks 520. A maximum for nano-peak distance 540 may be defined. In some embodiments, nano-peak distance 540 may be at most 1000 (in some embodiments, at most 750, 700, 600, 500, 400, 300, 250, 200, 150, or even at most 100) nanometers. In some embodiments, nano-peak distance 540 is at most 400 (in some embodiments, at most 300) nanometers.

A minimum for the nano-peak distance 540 may be defined. In some embodiments, nano-peak distance 540 may be at least 1 (in some embodiments, at least 5, 10, 25, 50, 75, 100, 150, 200, 250, 300, 350, 400, 450, or even at least 500) nanometers. In some embodiments, nano-peak distance 540 is at least 150 (in some embodiments, at least 200) nanometers.

In some embodiments, the nano-peak distance 540 is in a range from 150 to 400 (in some embodiments, 200 to 300) nanometers. In some embodiments, the nano-peak distance 540 is 250 nanometers.

Nano-peak distance 540 may be defined relative to the micro-peak distance 440 between corresponding micro-peaks 420. In some embodiments, corresponding micro-peak distance 440 is at least 10 (in some embodiments, at least 50, 100, 200, 300, 400, 500, 600, 700, 800, 900, or even at least 1000) times nano-peak distance 540. In some embodiments, corresponding micro-peak distance 440 is, at the low end, at least 200 (in some embodiments, at least 300) times nano-peak distance 540. In some embodiments, corresponding micro-peak distance 440 is, at the high end, at most 500 (in some embodiments, at most 400) times the nano-peak distance 540.

In some embodiments of forming the antisoiling surface, a method may include extruding a hot melt material having a UV-stable material. The extruded material may be shaped with a micro-replication tool. The micro-replication tool may include a mirror image of a series of micro-structures, which may form the series of micro-structures on the surface of antisoiling layer 208. The series of micro-structures may include a series of alternating micro-peaks and micro-spaces along an axis. A plurality of nano-structures may be formed on the surface of the layer on at least the micro-spaces. The plurality of nano-peaks may include at least one series of nano-peaks along the axis.

In some embodiments, the plurality nano-structures may be formed by exposing the surface to reactive ion etching. For example, masking elements may be used to define the nano-peaks.

In some embodiments, the plurality of nano-structures may be formed by shaping the extruded material with the micro-replication tool further having an ion-etched diamond. This method may involve providing a diamond tool wherein at least a portion of the tool comprises a plurality of tips, wherein the pitch of the tips may be less than 1 micrometer, and cutting a substrate with the diamond tool, wherein the diamond tool may be moved in and out along a direction at a pitch (p1). The diamond tool may have a maximum cutter width (p2) and $p_1/p_2 \geq 2$.

The nano-structures may be characterized as being embedded within the micro-structured surface of the antisoiling layer. Except for the portion of the nano-structure exposed to air, the shape of the nano-structure may generally be defined by the adjacent micro-structured material.

A micro-structured surface layer including nano-structures can be formed by use of a multi-tipped diamond tool. Diamond Turning Machines (DTM) can be used to generate micro-replication tools for creating antisoiling surface structures including nano-structures as described in U.S. Pat. Appl. Publ. No. 2013/0236697 (Walker et al.) A micro-structured surface further comprising nano-structures can be formed by use of a multi-tipped diamond tool, which may have a single radius, wherein the plurality of tips has a pitch of less than 1 micrometer. Such multi-tipped diamond tool may also be referred to as a "nano-structured diamond tool." Hence, a micro-structured surface wherein the micro-structures further comprise nano-structures can be concurrently formed during diamond tooling fabrication of the micro-structured tool. Focused ion beam milling processes can be used to form the tips and may also be used to form the valley of the diamond tool. For example, focused ion beam milling can be used to ensure that inner surfaces of the tips meet along a common axis to form a bottom of valley. Focused ion beam milling can be used to form features in the valley, such as concave or convex arc ellipses, parabolas, mathematically defined surface patterns, or random or pseudo-random patterns. A wide variety of other shapes of valley can also be formed. Exemplary diamond turning machines and methods for creating discontinuous, or non-uniform, surface structures can include and utilize a fast tool servo (FTS) as described in, for example, PCT Pub. No. WO 00/48037, published Aug. 17, 2000; U.S. Pat. No. 7,350,442 (Ehnes) and U.S. Pat. No. 7,328,638 (Gardiner); and U.S. Pat. Pub. No. 2009/0147361 (Gardiner).

In some embodiments, the plurality of nano-structures may be formed by shaping the extruded material, or antisoiling layer, with the micro-replication tool further having a nano-structured granular plating for embossing. Electrodeposition, or more specifically electrochemical deposition, can also be used to generate various surface structures including nano-structures to form a micro-replication tool. The tool may be made using a 2-part electroplating process, wherein a first electroplating procedure may form a first metal layer with a first major surface, and a second electroplating procedure may form a second metal layer on the first metal layer. The second metal layer may have a second major surface with a smaller average roughness than that of the first major surface. The second major surface can function as the structured surface of the tool. A replica of this surface can then be made in a major surface of an optical film to provide light diffusing properties. One example of an electrochemical deposition technique is described in PCT Pub. No. WO 2018/130926 (Derks et al.).

Figure 6:
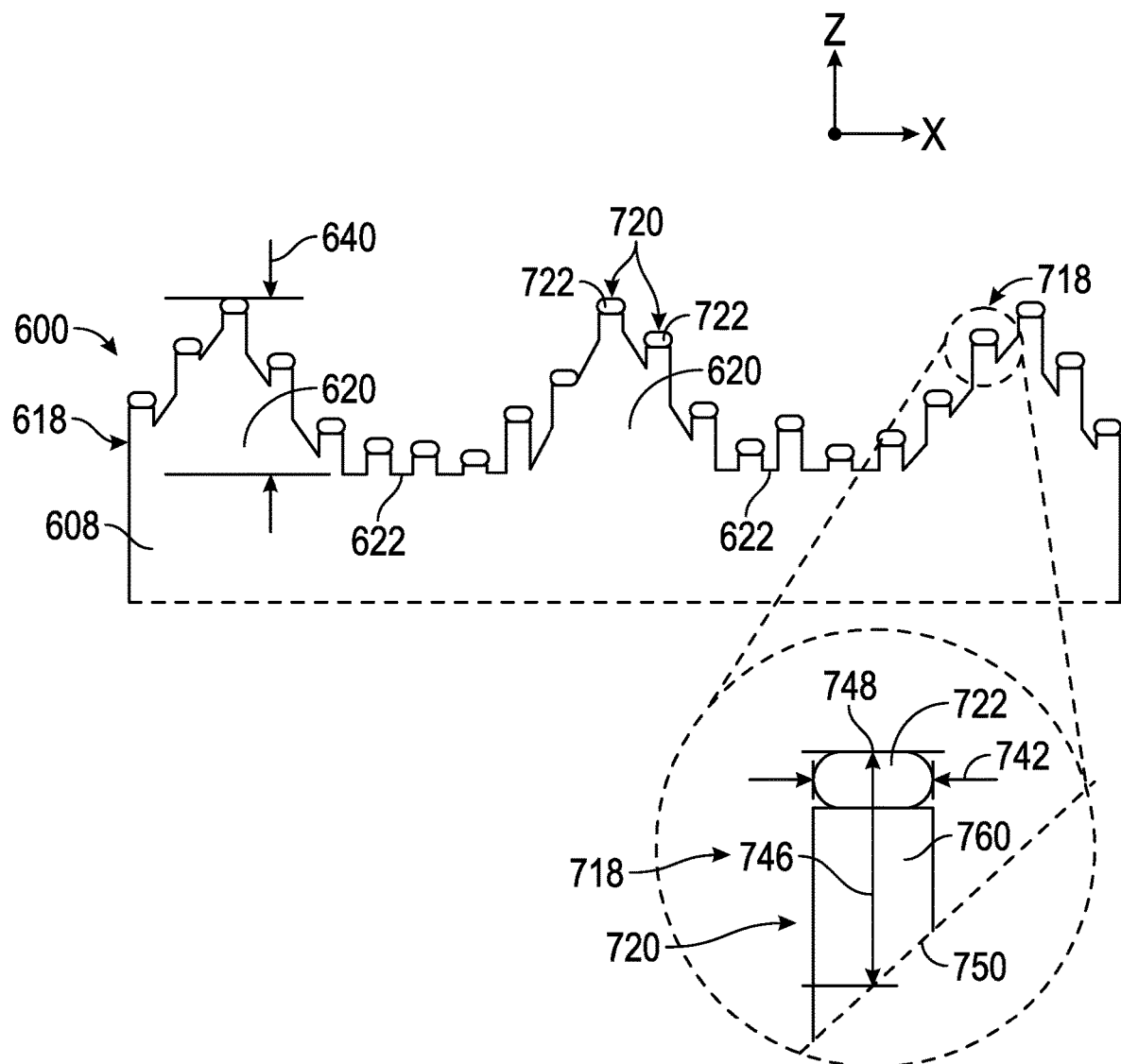
FIG. 6 is a cross-sectional illustration of various nano-structures including masking elements in an xz-plane as an alternative to the nano-structures of FIG. 5 that maybe used with the surface structure of FIGS. 4A-4C.

FIG. 6 shows cross section 600 of antisoiling layer 608 having antisoiling surface 602. Antisoiling surface 602 may be similar to antisoiling surface 402, for example, in that micro-structures 418, 618 of antisoiling layer 408, 608 may have the same or similar dimensions and may also form a skipped tooth riblet pattern of alternating micro-peaks 620 and micro-spaces 622. Antisoiling surface 602 differs from surface 402 in that, for example, nano-structures 720 may include nanosized masking elements 722.

Nano-structures 720 may be formed using masking elements 722. For example, masking elements 722 may be used in a subtractive manufacturing process, such as reactive ion etching (RIE), to form nano-structures 720 of surface 602 having micro-structures 618. A method of making a nano-structure and nano-structured articles may involve depositing a layer to a major surface of a substrate, such as antisoiling layer 408, by plasma chemical vapor deposition from a gaseous mixture while substantially simultaneously etching the surface with a reactive species. The method may include providing a substrate, mixing a first gaseous species capable of depositing a layer onto the substrate when formed into a plasma, with a second gaseous species capable of etching the substrate when formed into a plasma, thereby forming a gaseous mixture. The method may include forming the gaseous mixture into a plasma and exposing a surface of the substrate to the plasma, wherein the surface may be etched, and a layer may be deposited on at least a portion of the etched surface substantially simultaneously, thereby forming the nano-structure.

The substrate can be a (co)polymeric material, an inorganic material, an alloy, a solid solution, or a combination thereof. The deposited layer can include the reaction product of plasma chemical vapor deposition using a reactant gas comprising a compound selected from the group consisting of organosilicon compounds, metal alkyl compounds, metal isopropoxide compounds, metal acetylacetonate compounds, metal halide compounds, and combinations thereof. Nano-structures of high aspect ratio, and optionally with random dimensions in at least one dimension, and even in three orthogonal dimensions, can be prepared.

In some embodiments of a method of antisoiling layer 608 having a series of micro-structures 618 disposed on antisoiling surface 602 of the layer may be provided. The series of micro-structures 618 may include a series of alternating micro-peaks 620 and micro-spaces 622.

A series of nanosized masking elements 722 may be disposed on at least micro-spaces 622. Antisoiling surface 602 of antisoiling layer 608 may be exposed to reactive ion etching to form plurality of nano-structures 718 on the surface of the layer including series of nano-peaks 720. Each nano-peak 720 may include masking element 722 and column 760 of layer material between masking element 722 and layer 608.

Masking element 722 may be formed of any suitable material more resistant to the effects of RIE than the material of antisoiling layer 608. In some embodiments, masking element 722 includes an inorganic material. Non-limiting examples of inorganic materials include silica and silicon dioxide. In some embodiments, the masking element 722 is hydrophilic. Non-limiting examples of hydrophilic materials include silica and silicon dioxide.

As used herein, the term "maximum diameter" refers to a longest dimension based on a straight line passing through an element having any shape.

Masking elements 722 may be nanosized. Each masking element 722 may define maximum diameter 742. In some embodiments, the maximum diameter of masking element 722 may be at most 1000 (in some embodiments, at most 750, 500, 400, 300, 250, 200, 150, or even at most 100) nanometers.

Maximum diameter 742 of each masking element 722 may be described relative to micro-peak height 640 of corresponding micro-peak 620. In some embodiments, corresponding micro-peak height 640 is at least 10 (in some embodiments, at least 25, 50, 100, 200, 250, 300, 400, 500, 750, or even at least 1000) times maximum diameter 742 of masking element 722.

Each nano-peak 720 may define height 722. Height 722 may be defined between baseline 750 and the apex 748 of masking element 722.

Figure 7A:
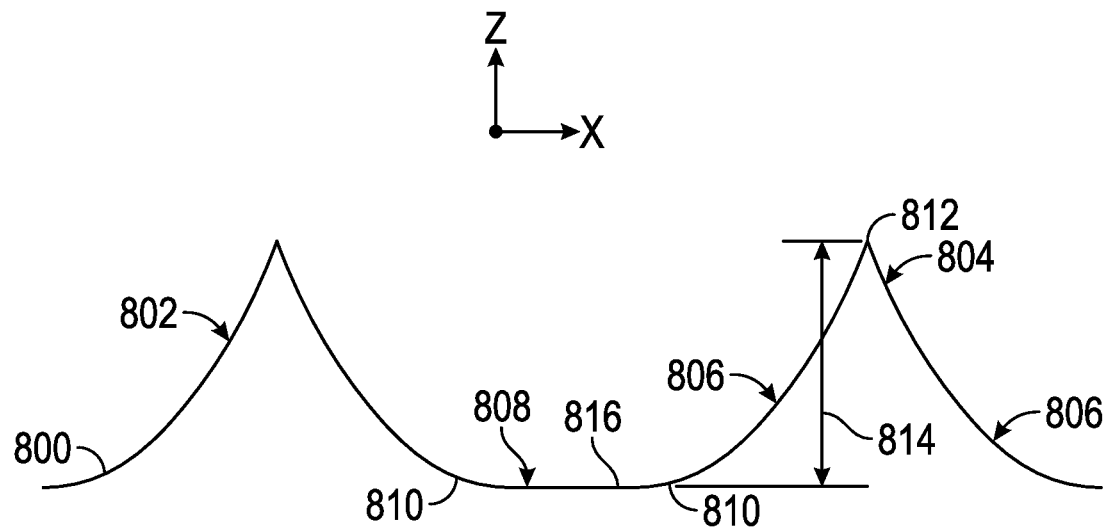
FIGS. 7A and 7B show illustrations of lines representing the cross-sectional profile of different forms of micro-structures for a surface structure in an xz-plane.
Figure 7B:
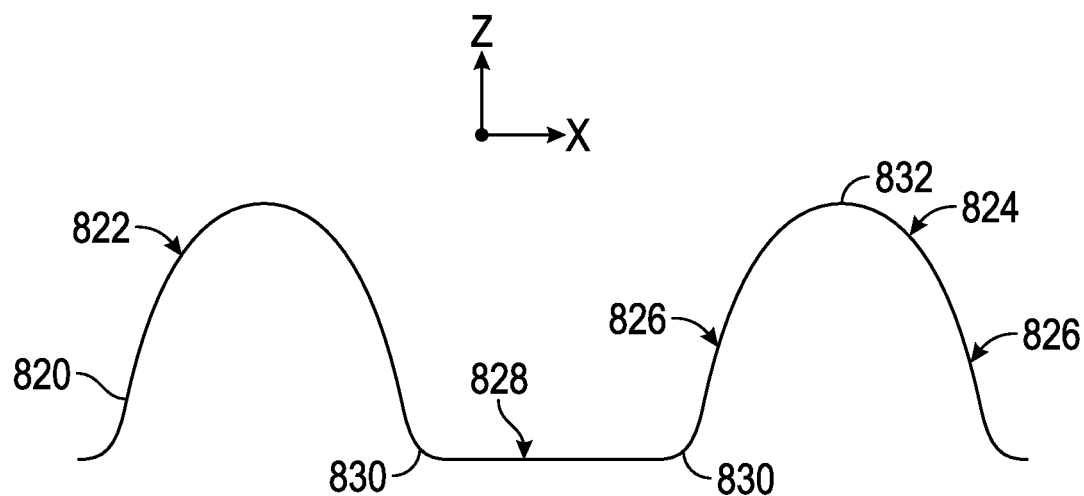

FIGS. 7A and 7B show lines 800 and 820 representing the cross-sectional profile of different forms of peaks 802, 822, which may be micro-peaks of micro-structures or nano-peaks of nano-structures, for any of the antisoiling surfaces, such as surfaces 402, 602. As mentioned, structures do not need to be strictly in the shape of a triangle.

Line 800 shows that first portion 804 (top portion) of peak 802, including apex 812, may have a generally triangular shape, whereas adjacent side portions 806 may be curved. In some embodiments, as illustrated, side portions 806 of peak 802 may not have a sharper turn as it transitions into space 808. Boundary 810 between side portion 806 of peak 802 and space 808 may be defined by a threshold slope of line 800 as discussed herein, for example, with respect to FIGS. 4A-4C and 5.

Space 808 may also be defined in terms of height relative to height 814 of peak 802. Height 814 of peak 802 may be defined between one of boundaries 810 and apex 812. Height of space 808 may be defined between bottom 816, or lowest point of space 808, and one of boundaries 810. In some embodiments, the height of space 808 may be at most 40% (in some embodiments, at most 30%, 25%, 20%, 15%, 10%, 5%, 4%, 3%, or even at most 2%) of height 814 of peak 802. In some embodiments, the height of space 808 is at most 10% (in some embodiments, at most 5%, 4%, 3%, or even at most 2%) of height 814 of peak 802.

Line 820 shows that first portion 824 (top portion) of peak 820, including the apex, may have a generally rounded shape without a sharp turn between adjacent side portions 826. Apex 832 may be defined as the highest point of structure 820, for example, where the slope changes from positive to negative. Although first portion 824 (top portion) may be rounded at apex 832, peak 820 may still define an angle, such as angle A (see FIG. 5), between first and second average slopes.

Boundary 830 between side portion 826 of peak 820 and space 828 may be defined, for example, by a sharper turn. Boundary 830 may also be defined by slope or relative height, as discussed herein.

As shown in FIGS. 8 to 11, the antisoiling surface may be discontinuous, intermittent, or non-uniform. For example, the antisoiling surface may also be described as including micro-pyramids with micro-spaces surrounding the micro-pyramids (see FIGS. 8 and 11).

Figure 8:
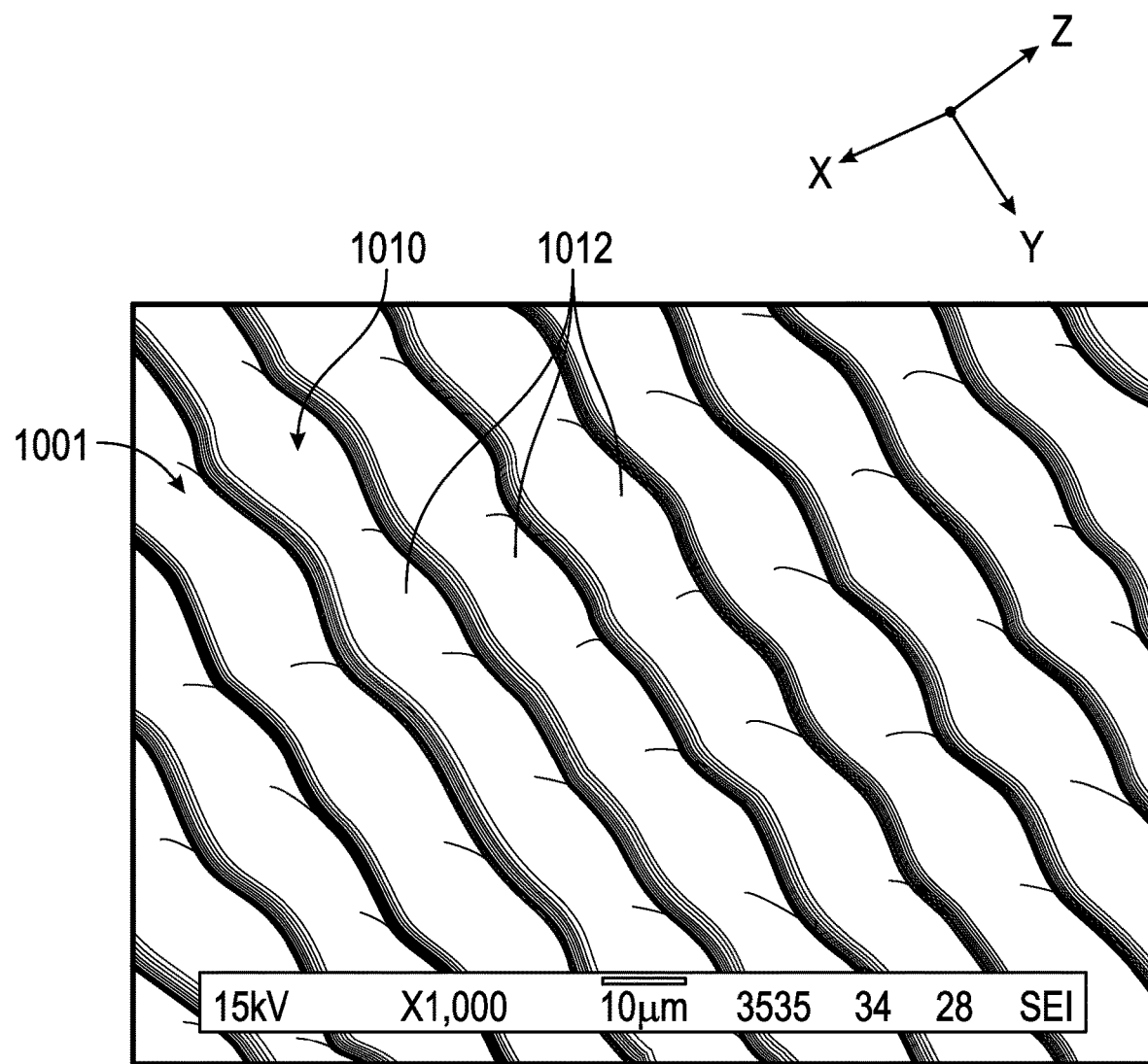
FIG. 8 is a perspective illustration of a portion of a first surface structure with discontinuous micro-structures.

FIG. 8 shows first antisoiling surface 1001 defined at least partially by non-uniform micro-structures 1210. For example, if antisoiling surface 1000 were viewed in the yz-plane (similar to FIG. 4B), at least one micro-peak 1012 may have a non-uniform height from the left side to the right side of the view, which can be contrasted to FIG. 4B showing micro-peak 420 having a uniform height from the left side to the right side of the view. In particular, micro-peaks 1012 defined by the micro-structures 1010 may be non-uniform in at least one of height or shape. The micro-peaks 1012 are spaced by micro-spaces (not shown in this perspective view), similar to other surfaces described herein, such as micro-space 422 of surface 402 (FIGS. 4A and 4C).

Figure 9:
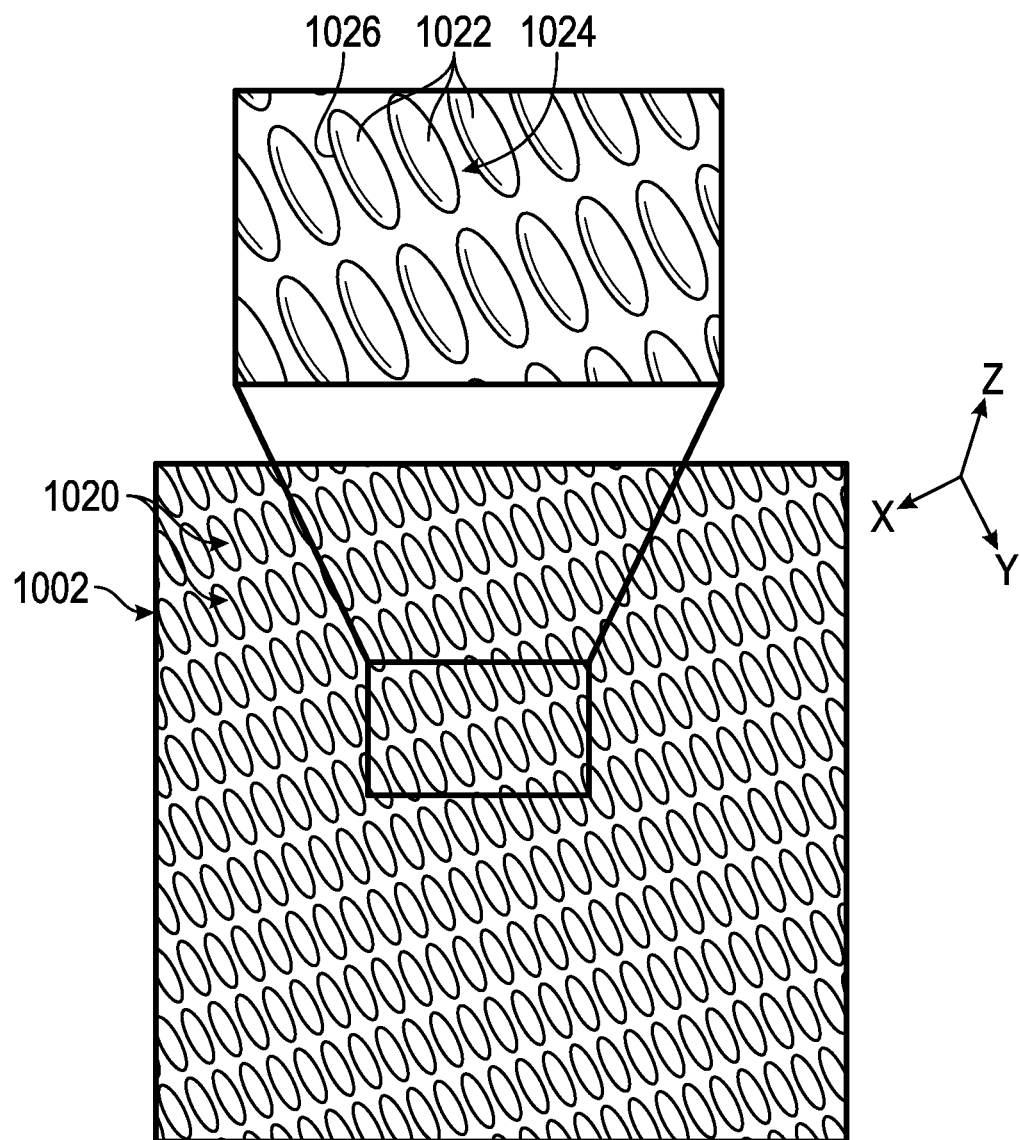
FIG. 9 is a perspective illustration of a portion of a second surface structure with discontinuous micro-structures.

FIG. 9 shows second antisoiling surface 1002 with discontinuous micro-structures 1020. For example, if antisoiling surface 1002 were viewed on the yz-plane (similar to FIG. 4B), more than one nano-peak 1022 may be shown spaced by micro-structures 1020, which can be contrasted to FIG. 4B showing micro-peak 420 extending continuously from the left side to the right side of the view. In particular, micro-peaks 1022 of micro-structures 1020 may be surrounded by micro-spaces 1024. Micro-peaks 1022 may each have a half dome-like shape. For example, the half dome-like shape may be a hemisphere, a half ovoid, a half-prolate spheroid, or a half-oblate spheroid. Edge 1026 of the base of each micro-peak 1022, extending around each micro-peak, may be a rounded shape (e.g., a circle, an oval, or a rounded rectangle). The shape of the micro-peaks 1022 may be uniform, as depicted in the illustrated embodiment, or can be non-uniform.

Figure 10:
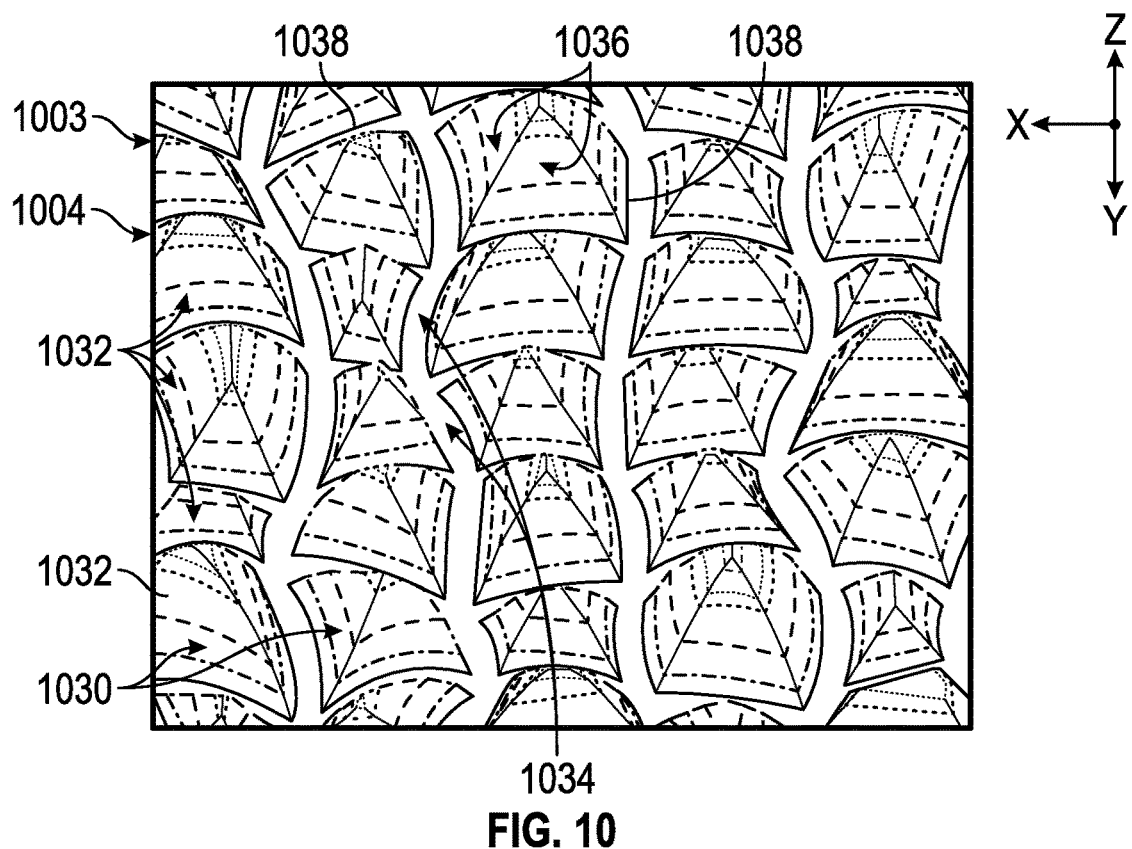
FIGS. 10 and 11 are perspective illustrations of different portions of a third surface structure with discontinuous micro-structures.
Figure 11:
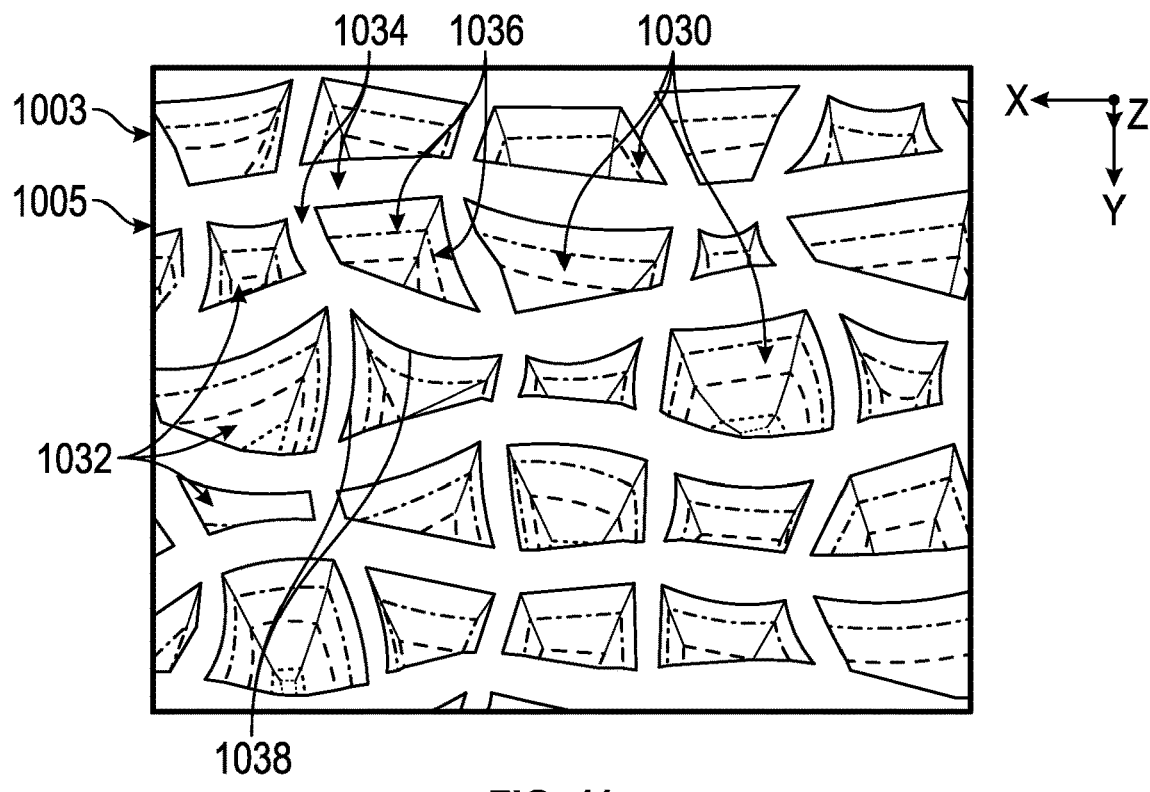

FIGS. 10 and 11 are perspective illustrations of first portion 1004 (FIG. 10) and second portion 1005 (FIG. 11) of third antisoiling surface 1003 with discontinuous micro-structures 1030. Both are perspective views. The FIG. 10 view shows more of a "front" side of the micro-structures 1030 close to a 45-degree angle, whereas the FIG. 11 view shows some of a "back" side of the micro-structures closer to an overhead angle.

Micro-peaks 1032 of micro-structures 1030 surrounded by micro-spaces 1034 may have a pyramid-like shape (e.g., micro-pyramids). For example, the pyramid-like shape may be a rectangular pyramid or a triangular pyramid. Sides 1036 of the pyramid-like shape may be non-uniform in shape or area, as depicted in the illustrated embodiment, or can be uniform in shape or area. Edges 1038 of the pyramid-like shape may be non-linear, as depicted in the illustrated embodiment, or can be linear. The overall volume of each micro-peak 1032 may be non-uniform, as depicted in the illustrated embodiment, or can be uniform.

The above detailed discussions make it clear that if desired, antisoiling surface 31 of antisoiling layer 30 may be textured, e.g., microstructured and/or nanostructured, to enhance its antisoiling properties. In general, the texturing may be achieved in any suitable manner, whether, e.g., achieved by molding or embossing surface 31 against an appropriate tooling surface, or by removal of material from an existing surface 31, e.g., by reactive ion etching, laser ablation, and so on. In some approaches, antisoiling layer 30 may comprise inorganic particles of an appropriate size and/or shape to provide the desired surface texture. In some embodiments, any such particles may be, e.g., deposited onto surface 31 and adhered thereto. In other embodiments, any such particles may be incorporated (e.g., admixed) into the material from which layer 30 is to be formed, with layer 30 then being formed in a way that allows the presence of the particles within layer 30 to cause surface 31 to exhibit corresponding texture. In some embodiments the presence of such particles may cause the surface of layer 30 to exhibit texture, in layer 30 as made. In other embodiments, such particles may cause texture to form, e.g., upon organic polymeric material being removed from the surface of layer 30 (e.g., by reactive ion etching) while the inorganic particles remain in place, as noted earlier herein. In a variation of such approaches, an inorganic material may be deposited onto a major surface of layer 30, e.g., by plasma deposition, concurrent with an organic material removal (e.g., reactive ion etching) process, to achieve similar affects. Such arrangements are discussed in U.S. patent Ser. No. 10/134,566.

Any such inorganic particles may comprise, e.g., titania, silica, zirconia, barium sulfate, calcium carbonate, or zinc oxide. In some embodiments the inorganic particles may be in the form of nanoparticles including: nanotitania, nanosilica, nanozironia, or even nano-scale zinc oxide particles. In some embodiments the inorganic particles may be in the form of beads or microbeads. The inorganic particles may be formed of a ceramic material, glass, (e.g., borosilicate glass particles available from Potters Industries), or various combinations of thereof. Suitable glass beads for use in the inorganic particle filled reflective layer available from Potters Industries include the trade designation "EMB-20". In some embodiments, the inorganic particles may have an effective D90 particle size (as defined in NIST "Particle Size Characterization," ASTM E-2578-07 (2012)) of at least 1 μm, to at most 40 μm.

Potentially suitable inorganic particles include ceramic microspheres available under the trade designations "3M CERAMIC MICROSPHERES WHITE GRADE W-210", "3M CERAMIC MICROSPHERES WHITE GRADE W-410", "3M CERAMIC MICROSPHERES WHITE GRADE W-610" from 3M Company, or various combinations thereof. Potentially suitable inorganic particles also include any of the products available from 3M Company under the trade designation 3M GLASS BUBBLES (K, S, or iM Series). In general, various combinations of inorganic particles of the same or different size may be used.

In some embodiments, cross-linked polymer microspheres, available under the trade designations "Chemisnow" from Soken Chemical & Engineering Co., may be added to either the anti-soiling layer or the particle filled reflective layer. Potentially suitable cross-linked polymer microspheres available from Soken Chemical & Engineering Co. include products with trade designations "MX-500" and "MZ-5HN". In some embodiments, semi-crystalline polymer beads, available under the trade designation "PTFE micro-powder TF 9207Z" from 3M Company, may be added to either the particle filled reflective layer or the anti-soiling layer.

While a primary purpose of any such texturing (e.g., microstructuring and/or nanostructuring) of outward surface 31 may be to provide enhanced antisoiling, the texturing may provide additional benefits. For example, some textures (depending, e.g., on the dimensions of the various structures relative to the wavelength of electromagnetic radiation) may enhance the passive cooling effects achieved by reflective layer 10 and by cooling film 1 as a whole. Furthermore, in instances in which cooling film 1 is applied, e.g., to an exterior surface of a vehicle, the texturing may achieve drag reduction. That is, the presence of micro and/or nano structures may result in a lowered coefficient of friction between the surface 31 and the air through which the vehicle is moving, which can result in cost and/or fuel savings.

In some embodiments an antistatic agent or agents may also be incorporated into the antisoiling layer to reduce unwanted attraction of dust, dirt, and debris. Ionic antistatic agents (e.g., under the trade designation 3M IONIC LIQUID ANTI-STAT FC-4400 or 3M IONIC LIQUID ANTI-STAT FC-5000 available from 3M Company) may be incorporated into, e.g., PVDF fluoropolymer layers to provide static dissipation. Antistatic agents for PMMA and methyl methacrylate copolymer (CoPMMA) optical polymer layers may be provided as STATRITE from Lubrizol Engineered Polymers, Brecksville, Ohio. Additional antistatic agents for PMMA and CoPMMA optical polymer layers may be provided as PELESTAT from Sanyo Chemical Industries, Tokyo, Japan. Optionally, antistatic properties can be provided with transparent conductive coatings, such as: indium tin oxide (ITO), fluorine doped tin oxide (FTO), aluminum doped zinc oxide (AZO), metallic nanowires, carbon nanotubes, or a thin layer of graphene, any of which may be disposed, or coated, onto one of the layers of the antisoiling surface structured films described herein. Additional suitable polymeric antistatic additives are available from CRODA International.

Adhesive Layer

As noted earlier, in some embodiments a cooling film 1 may comprise at least one layer of adhesive, e.g., pressure-sensitive adhesive. Such an adhesive layer may provide a means of affixing cooling film 1 to a suitable substrate 50; or, such an adhesive layer may bond together various layers of cooling film 1. In some embodiments, multiple adhesive layers may be present, of various types and for various purposes.

Such an adhesive layer may comprise any adhesive (e.g., thermosetting adhesive, hot melt adhesive, and/or pressure-sensitive adhesive). In some convenient embodiments, such an adhesive layer may be a pressure-sensitive adhesive layer. In some embodiments, the adhesive may be resistant to ultraviolet radiation damage (either inherently, or due to the presence of an added UV-stabilizer). Exemplary adhesives which are typically resistant to ultraviolet radiation damage include silicone adhesives and acrylic adhesives containing UV-stabilizing/absorbing/blocking additive(s).

In some embodiments, any such adhesive layer may comprise thermally-conductive particles to aid in heat transfer. Exemplary thermally-conductive particles include aluminum oxide particles, alumina nanoparticles, hexagonal boron nitride particles and agglomerates (e.g., available as 3M BORON DINITRIDE from 3M Company), graphene particles, graphene oxide particles, metal particles, and combinations thereof.

An adhesive layer 40 that is to be used to bond cooling film 1 to a substrate 50 may be supplied bearing a release liner on its inward surface (that is, the surface that will be bonded to the substrate after removal of the release liner). A release liner may comprise, for example, a polyolefin film, a fluoropolymer film, a coated PET film, or a siliconized film or paper. (Of course, if cooling film 1 is supplied already bonded to a substrate, no such release liner may be needed other than for processing in the factory.)

If an adhesive layer is to rely on a pressure sensitive adhesive ("PSA"), the pressure sensitive adhesive may be of any suitable composition. PSAs are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power.

One method useful for identifying pressure sensitive adhesives is the Dahlquist criterion. This criterion defines a pressure sensitive adhesive as an adhesive having a 1 second creep compliance of greater than $1 \times 10^{-6}$ cm$^2$/dyne as described in "Handbook of Pressure Sensitive Adhesive Technology", Donatas Satas (Ed.), $2^{nd}$ Edition, p. 172, Van Nostrand Reinhold, New York, N.Y., 1989, incorporated herein by reference. Alternatively, since modulus is, to a first approximation, the inverse of creep compliance, pressure sensitive adhesives may be defined as adhesives having a storage modulus of less than about $1 \times 10^6$ dynes/cm$^2$.

PSAs useful for practicing the present disclosure typically do not flow and have sufficient barrier properties to provide slow or minimal infiltration of oxygen and moisture through the adhesive bond line. In at least some embodiments the PSAs disclosed herein are generally transmissive to visible and infrared light such that they do not interfere with passage of visible light. In various embodiments, the PSAs may have an average transmission over the visible portion of the spectrum of at least about 75% (in some embodiments at least about 80, 85, 90, 92, 95, 97, or 98%) measured along the normal axis. In some embodiments, the PSA has an average transmission over a range of 400 nm to 1400 nm of at least about 75% (in some embodiments at least about 80, 85, 90, 92, 95, 97, or 98%). Exemplary PSAs include acrylates, silicones, polyisobutylenes, ureas, and combinations thereof. Some useful commercially available PSAs include UV curable PSAs such as those available from Adhesive Research, Inc., Glen Rock, Pa., under the trade designations "ARclear 90453" and "ARclear 90537" and acrylic optically clear PSAs available, for example, from 3M Company, St. Paul, Minn., under the trade designations "OPTICALLY CLEAR LAMINATING ADHESIVE 8171", "OPTICALLY CLEAR LAMINATING ADHESIVE 8172CL", and "OPTICALLY CLEAR LAMINATING ADHESIVE 8172PCL".

In some embodiments, PSAs useful for practicing the present disclosure have a modulus (tensile modulus) up to 50,000 psi ($3.4 \times 10^8$ Pa). The tensile modulus can be measured, for example, by a tensile testing instrument such as a testing system available from Instron, Norwood, Mass., under the trade designation "INSTRON 5900". In some embodiments, the tensile modulus of the PSA is up to 40,000, 30,000, 20,000, or 10,000 psi ($2.8 \times 10^8$ Pa, $2.1 \times 10^8$ Pa, $1.4 \times 10^8$ Pa, or $6.9 \times 10^8$ Pa).

In some embodiments, PSAs useful for practicing the present disclosure are acrylic PSAs. As used herein, the term "acrylic" or "acrylate" includes compounds having at least one of acrylic or methacrylic groups. Useful acrylic PSAs can be made, for example, by combining at least two different monomers (first and second monomers). Exemplary suitable first monomers include 2-methylbutyl acrylate, 2-ethylhexyl acrylate, isooctyl acrylate, lauryl acrylate, n-decyl acrylate, 4-methyl-2-pentyl acrylate, isoamyl acrylate, sec-butyl acrylate, and isononyl acrylate. Exemplary suitable second monomers include a (meth)acrylic acid (e.g., acrylic acid, methacrylic acid, itaconic acid, maleic acid, and fumaric acid), a (meth)acrylamide (e.g., acrylamide, methacrylamide, N-ethyl acrylamide, N-hydroxyethyl acrylamide, N-octyl acrylamide, N-t-butyl acrylamide, N,N-dimethyl acrylamide, N,N-diethyl acrylamide, and N-ethyl-N-dihydroxyethyl acrylamide), a (meth)acrylate (e.g., 2-hydroxyethyl acrylate or methacrylate, cyclohexyl acrylate, t-butyl acrylate, or isobornyl acrylate), N-vinyl pyrrolidone, N-vinyl caprolactam, an alpha-olefin, a vinyl ether, an allyl ether, a styrenic monomer, or a maleate.

Acrylic PSAs may also be made by including cross-linking agents in the formulation. Exemplary cross-linking agents include copolymerizable polyfunctional ethylenically unsaturated monomers (e.g., 1,6-hexanediol diacrylate, trimethylolpropane triacrylate, pentaerythritol tetraacrylate, and 1,2-ethylene glycol diacrylate); ethylenically unsaturated compounds which in the excited state are capable of abstracting hydrogen (e.g., acrylated benzophenones such as described in U.S. Pat. No. 4,737,559 (Kellen et al.), p-acryloxy-benzophenone, which is available from Sartomer Company, Exton, Pa., monomers described in U.S. Pat. No. 5,073,611 (Rehmer et al.) including p-N-(methacryloyl-4-oxapentamethylene)-carbamoyloxybenzophenone, N-(benzoyl-p-phenylene)-N'-(methacryloxymethylene)-carbodiimide, and p-acryloxy-benzophenone); nonionic crosslinking agents which are essentially free of olefinic unsaturation and is capable of reacting with carboxylic acid groups, for example, in the second monomer described above (e.g., 1,4-bis(ethyleneiminocarbonylamino)benzene; 4,4-bis(ethyleneiminocarbonylamino)diphenylmethane; 1,8-bis(ethyleneiminocarbonylamino)octane; 1,4-tolylene diisocyanate; 1,6-hexamethylene diisocyanate, N,N'-bis-1,2-propyleneisophthalamide, diepoxides, dianhydrides, bis(amides), and bis(imides)); and nonionic crosslinking agents which are essentially free of olefinic unsaturation, are noncopolymerizable with the first and second monomers, and, in the excited state, are capable of abstracting hydrogen (e.g., 2,4-bis(trichloromethyl)-6-(4-methoxy)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s-triazine; 2,4-bis(trichloromethyl)-6-(2,4-dimethoxy)phenyl)-s-triazine; 2,4-bis(trichloromethyl)-6-(3-methoxy)phenyl)-s-triazine as described in U.S. Pat. No. 4,330,590 (Vesley); 2,4-bis(trichloromethyl)-6-naphthenyl-s-triazine and 2,4-bis(trichloromethyl)-6-(4-methoxy)naphthenyl-s-triazine as described in U.S. Pat. No. 4,329,384 (Vesley)).

Typically, the first monomer is used in an amount of 80-100 parts by weight (pbw) based on a total weight of 100 parts of copolymer, and the second monomer is used in an amount of 0-20 pbw based on a total weight of 100 parts of copolymer. The crosslinking agent can be used in an amount of 0.005 to 2 weight percent based on the combined weight of the monomers, for example from about 0.01 to about 0.5 percent by weight or from about 0.05 to 0.15 percent by weight. Acrylic PSAs are described in detail in, for example, U.S. Pat. No. 9,614,113, which is incorporated by reference in its entirety herein.

The acrylic PSAs useful for practicing the present disclosure can be prepared, for example, by a solvent free, bulk, free-radical polymerization process (e.g., using heat, electron-beam radiation, or ultraviolet radiation). Such polymerizations are typically facilitated by a polymerization initiator (e.g., a photoinitiator or a thermal initiator). Exemplary suitable photoinitiators include benzoin ethers such as benzoin methyl ether and benzoin isopropyl ether, substituted benzoin ethers such as anisoin methyl ether, substituted acetophenones such as 2,2-dimethoxy-2-phenylacetophenone, and substituted alpha-ketols such as 2-methyl-2-hydroxypropiophenone. Examples of commercially available photoinitiators include IRGACURE 651 and DAROCUR 1173, both available from Ciba-Geigy Corp., Hawthorne, N.Y., and LUCERIN TPO from BASF, Parsippany, N.J. Examples of suitable thermal initiators include, but are not limited to, peroxides such as dibenzoyl peroxide, dilauryl peroxide, methyl ethyl ketone peroxide, cumene hydroperoxide, dicyclohexyl peroxydicarbonate, as well as 2,2-azo-bis(isobutryonitrile), and t-butyl perbenzoate. Examples of commercially available thermal initiators include VAZO 64, available from ACROS Organics, Pittsburgh, Pa., and LUCIDOL 70, available from Elf Atochem North America, Philadelphia, Pa. The polymerization initiator is used in an amount effective to facilitate polymerization of the monomers (e.g., 0.1 part to about 5.0 parts or 0.2 part to about 1.0 part by weight, based on 100 parts of the total monomer content).

If a photocrosslinking agent is used, the coated adhesive can be exposed to ultraviolet radiation having a wavelength of about 250 nm to about 400 nm. The radiant energy in this range of wavelength required to crosslink the adhesive is about 100 millijoules/cm$^2$ to about 1,500 millijoules/cm$^2$, or more specifically, about 200 millijoules/cm$^2$ to about 800 millijoules/cm$^2$.

A useful solvent-free polymerization method is disclosed in U.S. Pat. No. 4,379,201 (Heilmann et al.). Initially, a mixture of first and second monomers can be polymerized with a portion of a photoinitiator by exposing the mixture to UV radiation in an inert environment for a time sufficient to form a coatable base syrup, and subsequently adding a crosslinking agent and the remainder of the photoinitiator. This final syrup containing a crosslinking agent (e.g., which may have a Brookfield viscosity of about 100 centipoise to about 6000 centipoise at 23 C, as measured with a No. 4 LTV spindle, at 60 revolutions per minute) can then be coated onto the weatherable sheet. Once the syrup is coated onto the weatherable sheet, further polymerization and crosslinking can be carried out in an inert environment (e.g., nitrogen, carbon dioxide, helium, and argon, which exclude oxygen). A sufficiently inert atmosphere can be achieved by covering a layer of the photoactive syrup with a polymeric film, such as silicone-treated PET film, that is transparent to UV radiation or e-beam and irradiating through the film in air.

In some embodiments, PSAs useful for practicing the present disclosure comprise polyisobutylene. The polyisobutylene may have a polyisobutylene skeleton in the main or a side chain. Useful polyisobutylenes can be prepared, for example, by polymerizing isobutylene alone or in combination with n-butene, isoprene, or butadiene in the presence of a Lewis acid catalyst (for example, aluminum chloride or boron trifluoride).

Useful polyisobutylene materials are commercially available from several manufacturers.

Homopolymers are commercially available, for example, under the trade designations "OPPANOL" and "GLISSOPAL" (e.g., OPPANOL B15, B30, B50, B100, B150, and B200 and GLISSOPAL 1000, 1300, and 2300) from BASF Corp. (Florham Park, N.J.); "SDG", "JHY", and "EFROLEN" from United Chemical Products (UCP) of St. Petersburg, Russia. Polyisobutylene copolymers can be prepared by polymerizing isobutylene in the presence of a small amount (e.g., up to 30, 25, 20, 15, 10, or 5 weight percent) of another monomer such as, for example, styrene, isoprene, butene, or butadiene. Exemplary suitable isobutylene/isoprene copolymers are commercially available under the trade designations "EXXON BUTYL" (e.g., EXXON BUTYL 065, 068, and 268) from Exxon Mobil Corp., Irving, Tex.; "BK-1675N" from UCP and "LANXESS" (e.g., LANXESS BUTYL 301, LANXESS BUTYL 101-3, and LANXESS BUTYL 402) from Sarnia, Ontario, Canada. Exemplary suitable isobutylene/styrene block copolymers are commercially available under the trade designation "SIBSTAR" from Kaneka (Osaka, Japan). Other exemplary suitable polyisobutylene resins are commercially available, for example, from Exxon Chemical Co. under the trade designation "VISTANEX", from Goodrich Corp., Charlotte, N.C., under the trade designation "HYCAR", and from Japan Butyl Co., Ltd., Kanto, Japan, under the trade designation "JSR BUTYL". A polyisobutylene useful for practicing the present disclosure may have a wide variety of molecular weights and a wide variety of viscosities. Polyisobutylenes of many different molecular weights and viscosities are commercially available.

In some embodiments of PSAs comprising polyisobutylene, the PSA further comprises a hydrogenated hydrocarbon tackifier (in some embodiments, a poly(cyclic olefin)). In some of these embodiments, about 5 to 90 percent by weight the hydrogenated hydrocarbon tackifier (in some embodiments, the poly(cyclic olefin)) is blended with about 10 to 95 percent by weight polyisobutylene, based on the total weight of the PSA composition. Useful polyisobutylene PSAs include adhesive compositions comprising a hydrogenated poly(cyclic olefin) and a polyisobutylene resin such as those disclosed in Int. Pat. App. Pub. No. WO 2007/087281 (Fujita et al.).

The "hydrogenated" hydrocarbon tackifier component may include a partially hydrogenated resin (e.g., having any hydrogenation ratio), a completely hydrogenated resin, or a combination thereof. In some embodiments, the hydrogenated hydrocarbon tackifier is completely hydrogenated, which may lower the moisture permeability of the PSA and improve the compatibility with the polyisobutylene resin. The hydrogenated hydrocarbon tackifiers are often hydrogenated cycloaliphatic resins, hydrogenated aromatic resins, or combinations thereof. For example, some tackifying resins are hydrogenated C9-type petroleum resins obtained by copolymerizing a C9 fraction produced by thermal decomposition of petroleum naphtha, hydrogenated C5-type petroleum resins obtained by copolymerizing a C5 fraction produced by thermal decomposition of petroleum naphtha, or hydrogenated C5/C9-type petroleum resins obtained by polymerizing a combination of a C5 fraction and C9 fraction produced by thermal decomposition of petroleum naphtha. The C9 fraction can include, for example, indene, vinyltoluene, alpha-methylstyrene, beta-methylstyrene, or a combination thereof. The C5 fraction can include, for example, pentane, isoprene, piperine, 1,3-pentadiene, or a combination thereof. In some embodiments, the hydrogenated hydrocarbon tackifier is a hydrogenated poly(cyclic olefin) polymer. In some embodiments, the hydrogenated poly(cyclic olefin) is a hydrogenated poly(dicyclopentadiene), which may provide advantages to the PSA (e.g., low moisture permeability and transparency). The tackifying resins are typically amorphous and have a weight average molecular weight no greater than 5000 grams/mole.

Some suitable hydrogenated hydrocarbon tackifiers are commercially available under the trade designations "ARKON" (e.g., ARKON P or ARKON M) from Arakawa Chemical Industries Co., Ltd. (Osaka, Japan); "ESCOREZ" from Exxon Chemical; "REGALREZ" (e.g., REGALREZ 1085, 1094, 1126, 1139, 3102, and 6108) from Eastman (Kingsport, Tenn.); "WINGTACK" (e.g., WINGTACK 95 and RWT-7850) resins from Cray Valley (Exton, Pa.); "PICCOTAC" (e.g., PICCOTAC 6095-E, 8090-E, 8095, 8595, 9095, and 9105) from Eastman; "CLEARON", in grades P, M and K, from Yasuhara Chemical, Hiroshima, Japan; "FORAL AX" and "FORAL 105" from Hercules Inc., Wilmington, Del.; "PENCEL A", "ESTERGUM H", "SUPER ESTER A", and "PINECRYSTAL" from Arakawa Chemical Industries Co., Ltd., Osaka, Japan; from Arakawa Chemical Industries Co., Ltd.); "EASTOTAC H" from Eastman; and "IMARV" from Idemitsu Petrochemical Co., Tokyo, Japan.

In some embodiments an adhesive layer may be a so-called hot melt adhesive, e.g., that is extruded at a high temperature and, after cooling and solidifying, exhibits PSA properties. Extrudable hot melt adhesives can be formed into pressure sensitive adhesives by, for example, extrusion blending with tackifiers. Exemplary pressure sensitive adhesives are available, for example, under the trade designations "OCA8171" and "OCA8172" from 3M Company, St. Paul, Minn. Extrudable pressure sensitive adhesives are commercially available, for example, from Kuraray, Osaka, Japan, under the trade designations "LIR-290", "LA2330", "LA2250", "LA2140E", and "LA1114"; and Exxon Mobil, Irving, Tex., under the trade designation "ESCORE".

Exemplary extrudable adhesives also include isobutylene/isoprene copolymers available, for example, from Exxon Mobil Corp., under the trade designations "EXXON BUTYL 065," "EXXON BUTYL 068," and "EXXON BUTYL 268"; United Chemical Products, Velizy-Villacoublay, France, under the trade designation "BK-1675N"; LANXESS, Sarnia, Ontario, Canada, under the trade designation "LANXESS BUTYL 301"; "LANXESS BUTYL 101-3", and "LANXESS BUTYL 402"; and Kaneka, Osaka, Japan, under the trade designation "SIBSTAR" (available as both diblocks and triblocks. Exemplary polyisobutylene resins are commercially available, for example, from Exxon Chemical Co., Irving, Tex., under the trade designation "VISTANEX"; Goodrich Corp., Charlotte, N.C., under the trade designation "HYCAR"; and Japan Butyl Co., Ltd., Kanto, Japan, under the trade designation "JSR BUTYL". Various compositions and their use are described in U.S. Patent Application Publication No. 2019-0111666.

Such a PSA layer can be provided by techniques known in the art, such as hot melt extrusion of an extrudable composition comprising the components of the PSA composition. Advantageously, the PSA layer can be made by this process in the absence of solvents. Exemplary methods for making extrudable adhesives are described, for example, in PCT Pub. No. WO1995/016754A1 (Leonard et. al.), the disclosure of which is incorporated herein by reference in its entirety.

In some embodiments, at least one PSA layer present in cooling film 1 may comprise a UV blocker. As noted earlier, such terminology broadly encompasses materials commonly referred to as UV-absorbers (UVAs), light stabilizers (e.g., hindered amine light stabilizers) antioxidants, and so on. It will be appreciated that there may not necessarily be a bright-line demarcation between UV-blockers of these various types; for example, some materials may function by more than one of these mechanisms.

Examples of useful UVAs include those available from Ciba Specialty Chemicals Corporation under the trade designations "TINUVIN 328", "TINUVIN 326", "TINUVIN 783", "TINUVIN 770", "TINUVIN 479", "TINUVIN 928", "TINUVIN 1600", and "TINUVIN 1577". Some such UVAs, when used, can be present in an amount, e.g., from about 0.01 to 3 percent by weight based on the total weight of the pressure sensitive adhesive composition. Examples of useful UV blockers of the antioxidant type include hindered phenol-based compounds and phosphoric acid ester-based compounds (e.g., those available from Ciba Specialty Chemicals Corporation under the trade designations "IRGANOX 1010", "IRGANOX 1076", and "IRGAFOS 126" and butylated hydroxytoluene (BHT)). Antioxidants, when used, can be present in an amount, e.g., from about 0.01 to 2 percent by weight based on the total weight of the pressure sensitive adhesive composition. Examples of useful UV-blockers of the stabilizer type include phenol-based stabilizers, hindered amine-based stabilizers (e.g., those available from BASF under the trade designation "CHIMASSORB" such as "CHIMASSORB 2020"), imidazolebased stabilizers, dithiocarbamate-based stabilizers, phosphorus-based stabilizers, and sulfur ester-based stabilizers. Such compounds, when used, can be present in an amount from about 0.01 to 3 percent by weight based on the total weight of the pressure sensitive adhesive composition.

It will be appreciated that in some embodiments, a PSA layer may be free of UV-blocker or may need only include an amount of UV-blocker adequate to protect the PSA layer itself. For example, a PSA layer 40 that is used to bond cooling film 1 to a substrate 50 as shown in FIG. 1, may not need any UV-blocker. (However, since in some circumstances a lateral edge of a PSA layer 40 may be exposed to sunlight, in some embodiments such a PSA layer may advantageously include a sufficient amount of UV-blocking additive to protect the PSA layer.) If a PSA layer is positioned outward of reflective layer 10 (as in PSA layer 45 as shown in FIG. 3), such a PSA layer may include an amount of UV-blocking additive commensurate with the desire to protect the reflective layer 10 (rather than just protecting the PSA layer itself). Accordingly, in such embodiments the level of UV-blocking additive may be increased, e.g., above the exemplary ranges disclosed above, to any suitable level.

UV-blocking additives have been mentioned previously herein in the context of incorporating such materials into an adhesive (e.g., a PSA), a hardcoat, a standalone layer (e.g., a fluoropolymer layer that serves as an antisoiling layer) or a layer of a multilayer structure. UV-blocking additives will now be further discussed in general. Any such UV-blocking additive(s) may be added to any layer (or any component, portion or phase thereof) of cooling film 1. As noted, in some embodiments a UV-blocking additive may be incorporated into an adhesive that is used to join layers of the cooling film together. In some embodiments a UV-blocking additive may be incorporated into a hardcoat layer that serves as an antisoiling layer of the cooling film (and that may be textured, e.g., micro and/or nano structured). In some embodiments a UV-blocking additive may be incorporated into a fluoropolymer layer that, e.g., serves as an antisoiling layer of the cooling film (and that may be textured, e.g., micro and/or nano structured). In some embodiments a UV-blocking additive may be incorporated into a suitable layer of a multilayer structure that also includes other layers that do not include any UV-blocking additive. In various embodiments, multiple such layers or components thereof may include UV-blocking additive.

As noted above, UV-blockers as disclosed herein encompass those compounds known as UV absorbers (UVAs) and those compounds known as UV-stabilizers, in particular Hindered Amine Light Stabilizers (HALS) that can, for example, intervene in the prevention of photo-oxidation degradation of various polymers (for example, PET, PMMA, and CoPMMAs). Exemplary UVAs for incorporation into, e.g., PET, PMMA, or CoPMMA include benzophenones, benzotriazoles, and benzotriazines. Commercially available UVAs for incorporation into, e.g., PET, PMMA, or CoPMMA include those available as TINUVIN 1577 and TINUVIN 1600 from BASF Corporation, Florham Park, N.J. Another exemplary UV absorber is available, for example, in a polymethylmethacrylate (PMMA) UVA master batch from Sukano Polymers Corporation, Duncan, S.C., under the trade designation "TA11-10 MB03." UVAs may be incorporated in these or any other suitable polymers at a concentration of, for example, 1 to 10 weight percent. Exemplary HALS compounds for incorporation into PET, PMMA, or CoPMMA include those available as CHIMMASORB 944 and TINUVIN 123 from BASF Corporation. Another exemplary HALS is available, for example, from BASF Corp., under the trade designation "TINUVIN 944." HALS compounds may be into these or any other polymers at a concentration of, for example, 0.1-1.0 wt. %. A 10:1 ratio of UVA to HALS may be preferred. As noted, in some instances a HALS may synergistically enhance the performance of a UVA. Exemplary anti-oxidants include those available under the trade designations "IRGANOX 1010" and "ULTRANOX 626" from BASF.

UVAs and HALS compounds can also be incorporated into a fluoropolymer layer (whether, e.g., an antisoiling layer or a reflective layer). U.S. Pat. No. 9,670,300 (Olson et al.) and 10,125,251 (Olson et al.) describe exemplary UVA oligomers that are compatible with PVDF fluoropolymers. Other UV-blocking additives may be included in the fluoropolymer layers (or, in general, in any polymer layer). For example, small particle non-pigmentary zinc oxide and titanium oxide can be used. Nanoscale particles of zinc oxide, calcium carbonate, and barium sulfate may scatter UV-light (and may be somewhat reflective) while being transparent to visible and near infrared light. Small zinc oxide and barium sulfate particles in the size range of 10-100 nanometers can scatter or reflect UV-radiation are available, for example, from Kobo Products Inc., South Plainfield, N.J. Any such materials are suitable as long as the resulting UV-blocking layer (or layers) meets the criteria established previously herein.

In some embodiments, a UV-absorbing additive may be a red shifted UV absorber (RUVA) that, for example, absorbs at least 70% (in some embodiments, at least 80%, or even at least 90%) of the UV light in the wavelength region from 180 nm to 400 nm. A RUVA may have enhanced spectral coverage in the long-wave UV region (i.e., 300 nm to 400 nm), enabling it to block long-wavelength UV light. Exemplary RUVAs include, e.g., 5-trifluoromethyl-2-(2-hydroxy-3-alpha-cumyl-5-tert-octylphenyl)-2H-benzotriazole (available under the trade designation "CGL-0139" from BASF Corporation, Florham, N.J.), benzotriazoles (e.g., 2-(2-hydroxy-3,5-di-alpha-cumylphehyl)-2H-benzotriazole, 5-chloro-2-(2-hydroxy-3-tert-butyl-5-methylphenyl)-2H-benzotriazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole), and 2(-4,6-diphenyl-1-3,5-triazin-2-yl)-5-hexyloxy-phenol.

Uses of Cooling Film

Composite cooling films according to the present disclosure can be used to cool an entity with which they are in thermal (e.g., inductive, convective, radiative) communication. Reflectance in the solar region may be particularly effective in facilitating cooling of an entity during the day when subjected to sunlight by reflecting sunlight that would otherwise be absorbed by the entity. Absorption in the aforementioned atmospheric window may be particularly effective in facilitating cooling at night by radiating or emitting infrared light in the previously-mentioned atmospheric window (noting that according to Kirchoff's Law, an item that exhibits high absorption in a particular wavelength range will also exhibit high emissivity in that wavelength range). Energy may also be radiated or emitted during the day to some degree. In some embodiments, the cooling film will absorb a minimum of solar energy from 0.3 to 2.5 micrometers and absorb a maximum of solar energy from 8 to 13 micrometers.

Referring again to FIG. 1, composite cooling film 1 can be secured to a substrate 50 such that composite cooling film 1 is in thermal communication with substrate 50. Composite cooling film 1 may be generally planar in shape; however it does not need to be planar and may be flexible to conform to a nonplanar substrate 50. In some embodiments a substrate 50 may be an item (e.g., a slab of sheet metal) that is secured to any suitable entity 60 (e.g., a vehicle or building). In some embodiments a substrate 50 may be a component of the entity itself (for example, substrate 50 may be a roof or panel of a vehicle, such as, e.g., a car or bus). In some embodiments, composite cooling film will be positioned so that it faces at least generally skyward.

In some embodiments, cooling film may form part of a cooling panel that may be disposed on the exterior of at least part of a building or a heat transfer system, for example. The cooling panel and/or heat transfer system can cool a fluid, liquid or gas, which can then be used to remove heat from any desired entity, e.g., a building, a transformer, a broadcast antenna, a server, server farm or data center (e.g., used for cooling a fluid that a server is submerged in), or a vehicle or a component thereof, including an electric vehicle battery. In particular embodiments the cooling panel can remove heat from a heat-rejection component (e.g., condenser) of a cooling/refrigeration/heat pump system.

In some embodiments, a composite cooling film 1 as disclosed herein may exhibit relatively broadband absorption (and thus emission), e.g., outside the solar irradiation wavelength range of 400-2500 nm. Work herein has indicated that the use of a cooling film 1 that exhibits broadband emission may advantageously enhance the ability of cooling film 1 to passively cool an entity that, in normal operation, is often at a temperature above, e.g., significantly above, the ambient temperature of the surrounding environment. Such entities may include, for example, a heat-rejecting unit (e.g., a heat exchanger, condenser, and/or compressor, and any associated items) of a cooling/refrigeration/heat pump system. Such a heat-rejecting entity may be, for example, an external (e.g., outdoor) unit of a residential cooling or HVAC system or of a commercial or large-scale cooling or HVAC system. Or, such a heat-rejecting entity may be an external unit of a commercial refrigeration or freezer system. In particular embodiments, such an entity may be an external component of a cooling unit of a large refrigerated shipping container such as a truck trailer, rail car, or intermodal container. (Such large-scale refrigerated shipping containers and the like are referred to as "reefers" in the trade.) In some embodiments, such an entity may be a high-voltage transformer, or a high powered broadcast antenna (e.g., such as used in mass-element/beam-forming systems for 5G wireless communication). In any such embodiments, cooling film 1 may exhibit an average absorbance of at least 0.7, 0.8, 0.85, or 0.9, over a wavelength range with a lower limit of, e.g., 4, 5, 6 or 7 microns, and/or may exhibit such absorbance over a wavelength that extends to an upper limit of, e.g., 14, 16, 18 or 20 microns.

Various uses to which a cooling film may be put are discussed for example in U.S. Provisional Patent Application No. 62/611,639 and in the resulting PCT International Application Publication No. WO 2019/130199; and, in U.S. Patent Application U.S. Provisional Patent Application No. 62/855,392, all of which are incorporated by reference in their entirety herein.

A composite cooling film as disclosed herein may exhibit an average absorbance over the wavelength range 8-13 microns (measured in accordance with procedures outlined in the above-cited '392 US provisional application) of at least 0.85. Among other parameters, the amount of cooling and temperature reduction may depend on the reflective and absorptive properties of composite cooling film 1. The cooling effect of composite cooling film 1 may be described with reference to a first temperature of the ambient air proximate or adjacent to the substrate and a second temperature of the portion of substrate 50 proximate or adjacent to composite cooling film 1. In some embodiments, the first temperature is greater than the second temperature by at least 2.7 (in some embodiments, at least 5.5, 8.3, or even at least 11.1) degrees Celsius (e.g., at least 5, 10, 15, or even at least 20 degrees Fahrenheit).

In various embodiments, a composite cooling film as disclosed herein may exhibit an average reflectance of electromagnetic radiation of at least 85, 90, or 95% over a wavelength range from 400 to 2500 nanometers. As noted earlier, in some embodiments this may be an average value obtained by weighting the data over this wavelength range according to the weightings of the AM1.5 standard solar spectrum, which provides an indication of the ability of the cooling film to reflect solar irradiation.

It will be apparent to those skilled in the art that the specific exemplary embodiments, elements, structures, features, details, arrangements, configurations, etc., that are disclosed herein can be modified and/or combined in numerous ways. It is emphasized that any embodiment disclosed herein may be used in combination with any other embodiment or embodiments disclosed herein, as long as the embodiments are compatible. For example, any herein-described arrangement of a various layers of a cooling film may be used in combination with any herein-described compositional feature of any such layer, as long as such features and arrangements result in a compatible combination. Similarly, the methods disclosed herein may be used with a cooling film comprising any of the arrangements, compositional features, and so on, disclosed herein. While a limited number of exemplary combinations are presented herein, it is emphasized that all such combinations are envisioned and are only prohibited in the specific instance of a combination that is incompatible.

In summary, numerous variations and combinations are contemplated as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A composite cooling film comprising:
   a reflective nonporous inorganic-particle-filled organic polymeric layer that exhibits an average reflectance of electromagnetic radiation of at least 85% over a wavelength range from 400 to 2500 nanometers, an ultraviolet-protective layer of organic polymeric material that is disposed outwardly of the reflective nonporous inorganic-particle-filled organic polymeric layer; and, an antisoiling layer of organic polymeric material, the antisoiling layer being disposed outwardly of the reflective nonporous inorganic-particle-filled organic polymeric layer and comprising an outwardly-facing, exposed antisoiling surface;

wherein the composite cooling film has an average absorbance over the wavelength range 8-13 microns of at least 0.85.

2. The composite cooling film of claim 1 wherein the reflective nonporous inorganic-particle-filled organic polymeric layer is a pre-made inorganic-particle-filled film.

3. The composite cooling film of claim 1 wherein the reflective nonporous inorganic-particle-filled organic polymeric layer is an inorganic-particle-filled painted layer.

4. The composite cooling film of claim 3 wherein the painted layer comprises a binder that is an organic polymeric material chosen from polymethylmethacrylate, co-polymethylmethacrylates, polyurethanes, polyolefins, and fluoropolymers.

5. The composite cooling film of claim 1 wherein the inorganic particles are chosen from the group consisting of titania, alumina, calcium carbonate, zinc oxide, barium sulfate, and kaolin clay.

6. The composite cooling film of any of claim 1 wherein the ultraviolet-protective layer of organic polymeric material comprises an ultraviolet-reflective layer.

7. The composite cooling film of claim 6 wherein the ultraviolet-reflective layer comprises a multilayer optical film.

8. The composite cooling film of claim 1 wherein the ultraviolet-protective layer of organic polymeric material comprises an ultraviolet-absorbing layer.

9. The composite cooling film of claim 1 wherein the composite cooling film further comprises a layer of pressure-sensitive adhesive disposed inwardly of the reflective nonporous inorganic-particle-filled organic polymeric layer.

10. The composite cooling film of claim 1 wherein the ultraviolet-protective layer is bonded to the reflective nonporous inorganic-particle-filled organic polymeric layer via a layer of pressure-sensitive adhesive.

11. The composite cooling film of claim 1 wherein the antisoiling layer is bonded to the ultraviolet-protective layer by a layer of pressure-sensitive adhesive.

12. The composite cooling film of claim 1 wherein the ultraviolet-protective layer of organic polymeric material comprises a UV-absorbing layer that is a layer of pressure-sensitive adhesive that is loaded with at least one UV-blocking additive and that is disposed between the reflective nonporous inorganic-particle-filled organic polymeric layer and the antisoiling layer so as to adhesively bond the reflective nonporous inorganic-particle-filled organic polymeric layer and the antisoiling layer to each other.

13. The composite cooling film of claim 1, wherein the antisoiling layer of organic polymeric material is a fluorinated organic polymeric material.

14. The composite cooling film of claim 1, wherein the ultraviolet-protective layer of organic polymeric material is an ultraviolet-absorbing layer of organic polymeric material that is the same layer as the antisoiling layer of organic polymeric material.

15. The composite cooling film of claim 1, wherein the composite cooling film comprises a multilayer structure disposed outwardly of the reflective nonporous inorganic-particle-filled organic polymeric layer; and, wherein an outermost layer of the multilayer structure provides the antisoiling layer of the composite cooling film and another layer of the multilayer structure, which other layer is positioned inwardly of the antisoiling layer, provides a UV-protective layer of the composite cooling film in the form of a UV-absorbing layer.

16. The composite cooling film of claim 15 wherein the multilayer structure is a coextruded structure, wherein the layer of the multilayer structure that provides the antisoiling layer of the composite cooling film comprises a fluorinated polymeric material; and, wherein the other layer of the multilayer structure that provides the UV-absorbing layer of the composite cooling film, comprises a non-fluorinated polymeric material that is loaded with at least one UV-blocking additive.

17. The composite cooling film of claim 1 wherein the outwardly-facing, exposed antisoiling surface of the antisoiling layer is a textured surface comprising micro-structures and/or nano-structures.

18. The composite cooling film of claim 17, wherein the outwardly-facing, exposed antisoiling surface of the antisoiling layer extends along an axis, and wherein a plane containing the axis defines a cross-section of the antisoiling layer and intersects the surface to define a line describing the surface in two dimensions, the layer comprising:

a series of micro-structures at least partially defined by the line, the line defining a series of alternating micro-peaks and micro-spaces along the axis, wherein each micro-space comprises a maximum absolute slope defining an angle from the axis of at most 30 degrees, wherein each micro-peak comprises a first micro-segment defining a first average slope and a second micro-segment defining a second average slope, and wherein an angle formed between the first and second average slopes is at most 120 degrees; and a plurality of nano-structures at least partially defined by the line, the line defining at least one series of nano-peaks disposed on at least the micro-spaces along the axis, wherein each nano-peak has a height and each corresponding micro-peak has a height of at least 10 times the height of the nano-peak.

19. The composite cooling film of claim 18, wherein the micro-peak first average slope is positive, and the micro-peak second average slope is negative.

20. The composite cooling film of claim 18, wherein a width of each micro-space is at least one of: at least 10% of a corresponding micro-peak distance or at least 10 micrometers.

21. The composite cooling film of claim 18, wherein a micro-peak distance between micro-peaks is in a range from 1 micrometer to 1000 micrometers.

22. The composite cooling film of claim 18, wherein the micro-peaks have a height of at least 10 micrometers.

23. The composite cooling film of claim 18, wherein the plurality of nano-structures is further disposed on the micro-peaks.

24. The composite cooling film of claim 17, wherein at least some of the micro-structures and/or nano-structures are provided by inorganic particles present on the outwardly-facing, exposed antisoiling surface.

* * * * *